United States Patent [19]

Ohtaki et al.

[11] Patent Number: 5,123,103

[45] Date of Patent: Jun. 16, 1992

[54] METHOD AND SYSTEM OF RETRIEVING PROGRAM SPECIFICATION AND LINKING THE SPECIFICATION BY CONCEPT TO RETRIEVAL REQUEST FOR REUSING PROGRAM PARTS

[75] Inventors: Noriko Ohtaki, Machida; Yoshiaki Nagai, Yokohama; Yuji Magamatsu, Kawasaki; Eiki Chigira, Tokyo, all of Japan

[73] Assignee: Hitachi, Ltd., Tokyo, Japan

[21] Appl. No.: 109,269

[22] Filed: Oct. 15, 1987

[30] Foreign Application Priority Data

Oct. 17, 1986 [JP] Japan ............... 61-246791
Feb. 18, 1987 [JP] Japan ............... 62-33232

[51] Int. Cl.⁵ .............................. G06F 15/40
[52] U.S. Cl. ................ 395/600; 364/282.1; 364/283.4; 364/274; 364/286; 364/DIG. 1
[58] Field of Search ... 364/200 MS File, 900 MS File

[56] References Cited

U.S. PATENT DOCUMENTS

| | | | |
|---|---|---|---|
| 4,283,771 | 8/1981 | Chang | 364/200 |
| 4,384,329 | 5/1983 | Rosenbaum | 364/300 |
| 4,455,619 | 6/1984 | Masui | 364/900 |
| 4,497,039 | 1/1985 | Kitakami | 364/200 |
| 4,498,142 | 2/1985 | Advani | 364/900 |
| 4,506,326 | 3/1985 | Shaw | 364/900 |
| 4,555,771 | 11/1985 | Hayashi | 364/900 |
| 4,558,413 | 12/1985 | Schmidt | 364/200 |
| 4,611,298 | 9/1986 | Schuldt | 364/900 |
| 4,631,664 | 12/1986 | Bachman | 364/200 |
| 4,636,974 | 1/1987 | Griffin | 364/900 |
| 4,644,471 | 2/1987 | Kojima | 364/300 |
| 4,674,066 | 6/1987 | Kucera | 364/900 |
| 4,680,705 | 7/1987 | Shu | 364/300 |
| 4,714,995 | 12/1987 | Materna | 364/200 |
| 4,734,854 | 3/1988 | Afshar | 364/200 |
| 4,742,467 | 5/1988 | Messerich | 364/200 |
| 4,769,772 | 9/1988 | Dwyer | 364/200 |
| 4,774,661 | 9/1988 | Kumpati | 364/900 |
| 4,809,170 | 2/1989 | Leblang | 364/200 |
| 4,819,156 | 4/1989 | DeLorme et al. | 364/200 |
| 4,825,354 | 4/1989 | Agrawal | 364/200 |
| 4,827,411 | 5/1989 | Arrowood et al. | 364/200 |
| 4,829,427 | 5/1989 | Green | 364/200 |
| 4,833,601 | 5/1989 | Cheng | 364/200 |
| 4,835,683 | 5/1989 | Phillips | 364/200 |
| 4,891,441 | 6/1989 | Nixon | 364/300 |
| 4,864,497 | 9/1989 | Lowry | 364/200 |
| 4,894,771 | 1/1990 | Kunii | 364/300 |

*Primary Examiner*—Thomas C. Lee
*Assistant Examiner*—Eric Coleman
*Attorney, Agent, or Firm*—Fay, Sharpe, Beall, Fagan, Minnich & McKee

[57] ABSTRACT

Herein disclosed is a software information reusing system comprising: a data base for storing software information; a dialogue display terminal; thereby processing the information inputted from the display terminal. First retrieval information of the software information is registered as data related with a link of a data information related concept. If second retrieval information is not in the registered data, it is judged on the basis of the link of the related concept whether or not third retrieval information related therewith exists. The data base is retrieved on the basis of the third retrieval information. As a result, it is possible: to form a dictionary data base including a noun dictionary and a synonym dictionary for analyzing and generalizing the data object of the specification to be newly registered; for a user unacquainted with the business knowledge to automatically extract a proper retrieval keyword from a retrieval request sentence describing the software coming into the mind of the user; and to judge from the relations between the keyword information and the before and behind words whether or not even a composed word left either unregistered as one word or unknown is the retrieval keyword, if even one of elements composing the composed word is found to have the corresponding keyword information.

17 Claims, 19 Drawing Sheets

FIG. 10

161~C⟩ WHAT KIND OF SPECIFICATION DOCUMENT DO YOU WANT ?
162~U⟩ I WANT A DOCUMENT OF FORMING ERROR LIST
163~U⟩ DOCUMENTS OF FORMING ERROR LIST ARE AS FOLLOWS
( SHOW THE SPECIFICATION DOCUMENT INFORMATION )

FIG. 11

164~C⟩ WHAT KIND OF SPECIFICATION DOCUMENT DO YOU WANT ?
165~U⟩ I INVESTIGATE A DOCUMENT OF FORMING SOMETHING
166~C⟩ WHAT DO YOU FORM ?
167~U⟩ A POST CARD
168~C⟩ WHAT KIND OF POST CARD DO YOU WANT ?
169~U⟩ A LOAN ACCEPTANCE POST CARD
170~C⟩ DOCUMENTS OF FORMING A LOAN ACCEPTANCE POST CARD ARE AS FOLLOWS
( SHOW THE SPECIFICATION DOCUMENT INFORMATION )

FIG. 12

171~C⟩ WHAT KIND OF SPECIFICATION DOCUMENT DO YOU WANT ?
172~U⟩ A POST CARD
173~C⟩ WHAT DO YOU DO WITH THE POST CARD ?
174~U⟩ WHAT KIND OF POST CARD DO YOU HAVE ?
175~C⟩ DOCUMENTS OF POST CARD ARE AS FOLLOWS
1. A LOAN ACCEPTANCE POST CARD    2. A EVENT INVITATION CARD

FIG. 21

| NUMBER | TEXT | KEY WORD INFORMATION |
|---|---|---|
| 1 | SYSTEM | <NOUN> + SYSTEM |
| 2 | DATA | <NOUN> + DATA |
| 3 | MANAGEMENT | <NOUN> + MANAGEMENT |
| 4 | STOCKING | IT CAN BE USED AS A KEY WORD |
| ⋮ | ⋮ | ⋮ |

METHOD AND SYSTEM OF RETRIEVING PROGRAM SPECIFICATION AND LINKING THE SPECIFICATION BY CONCEPT TO RETRIEVAL REQUEST FOR REUSING PROGRAM PARTS

BACKGROUND OF THE INVENTION

1. Field of the Invention

The present invention relates to a software specification and program information storing and utilizing technique which is suitable for a system, software or program designer to make a novel software by making use of existing software specification and source program and, more particularly, to a retrieval keyword selecting system using dictionary information, which is suitable for developing a novel software by analyzing a request specification in a natural language and by retrieving the existing specification for its correction and reuse.

2. Description of the Prior Art

In the prior art, the data base and management technique of a software specification is discussed in ACM, SIGOA (June, 1984), pp. 132-142.

The prior art discussed takes no consideration into automation of new registration of the specification in a data base and has a problem that the existing data base has to be analyzed by the operator to register the new specification.

In order to retrieve the specification at a certain level as to a developed consistent system (e.g., the system of a customer A), moreover, the prior art can input the customer system name and the detail level to retrieve the specification of a requested software or a source program. When the user is not acquainted with the business system to be retrieved, no consideration is taken into the retrieval of what the user desires, and the prior art has another problem that many trials and errors have to be repeated before the user can retrieve what he desires.

On the other hand, the keyword extraction from a Japanese sentence is also discussed in the prior art in Reports of Society of Japanese Electronic Communications, '82/10, vol. J65-D, No 10 (1982), pp. 1195-1202.

The keyword extraction method of the prior art makes a detail syntax to extract the keywords in accordance with the roles of the words in the syntax. As to the selection of the extracted keywords, unnecessary words such as prefixes and suffixes are eliminated, but the other words are not taken into consideration. This makes it impossible to judge whether or not the keywords are effective. This judgement is either made by the operator or to decide that all be the keywords so that it cannot cope with many unknown words appearing in the request specification to a new system. Thus, the prior art has a problem in the performance of the retrieval keywords when the existing specification is to be retrieved.

SUMMARY OF THE INVENTION

The present invention has been conceived in view of the background thus far described and has a first object to provide a software information reusing system which can eliminate the above-specified problems in the prior art and can systematically sort the existing specification to automatically register a new specification in a suitable portion of a data base in accordance with the sorted system.

A second object of the present invention is to provide a software development supporting system which is enabled to efficiently select the document of a suitable software by arranging and storing the index of the document of a software to be stored and used without grasping the document as it is, by analyzing a sentence such as a natural word sentence describing the retrieval request inputted by a user, and by extracting a keyword corresponding to a proper retrieval index.

Another object of the present invention is to provide a system which can judge from the relations between the individual elements composing the composed word and the before and behind words whether or not even a composed word such as one unregistered as one word in a terminology dictionary or an unknown word is a retrieval keyword.

In order to achieve the above-specified objects, according to the present invention, there is provided in a software information reusing system comprising: a data base for storing software information; a dialogue display terminal; a means for processing the information inputted from said display terminal, and a software information reusing method comprising the steps of: registering first retrieval information of said software information as data related with a link of a data information related concept; judging on the basis of the link of said related concept, if second retrieval information is not in said registered data, whether or not third retrieval information related therewith exists; and retrieving said data base on the basis of said third retrieval information.

The foregoing and other objects, advantages, manner of operation and novel features of the present invention will be understood from the following detailed description when read in connection with the accompanying drawings.

BRIEF DESCRIPTION OF THE DRAWINGS

FIGS. 10 to 12 are diagrams showing the frame displaying examples of the dialogues between the system of the third embodiment and the user;

FIG. 21 is a diagram showing an example of the keyword information of the terminology dictionary to be used for judging the example of FIG. 20.

DETAILED DESCRIPTION OF THE PREFERRED EMBODIMENTS

In the specification information registration system corresponding to the first object of the present invention, the specification information data base is hierarchized according to the degree of generalization of the data object and is linked on the lowest-level generalization concept to the document information and the data specification so that the most proper portion is discovered by following the generalization link when the generalization concept is retrieved by the data object to determine a portion to be registered with new specification information. Incidentally, the dictionary data base can stepwise generalize the center data object of the specification to retrieve a higher-level concept.

In the retrieval keyword extraction system corresponding to the second object of the present invention, on the other hand, by the concept data dictionary which is stored with not only the expression type (or document) of the specification and source program of the software but also the index portion in the networked form, the data type name and operation name extracted from the retrieval request sentence inputted by the user and analyzed are collated with the concept data dictionary stored to find out the corresponding data type. The analysis of the retrieval request sentence at this time can be reliably analyzed with clear syntax rules because it satisfies the object if it can extract the data type name and operation name.

The present invention will be described in detail in the following in connection with the embodiments thereof with reference to the accompanying drawings.

Figure 2:
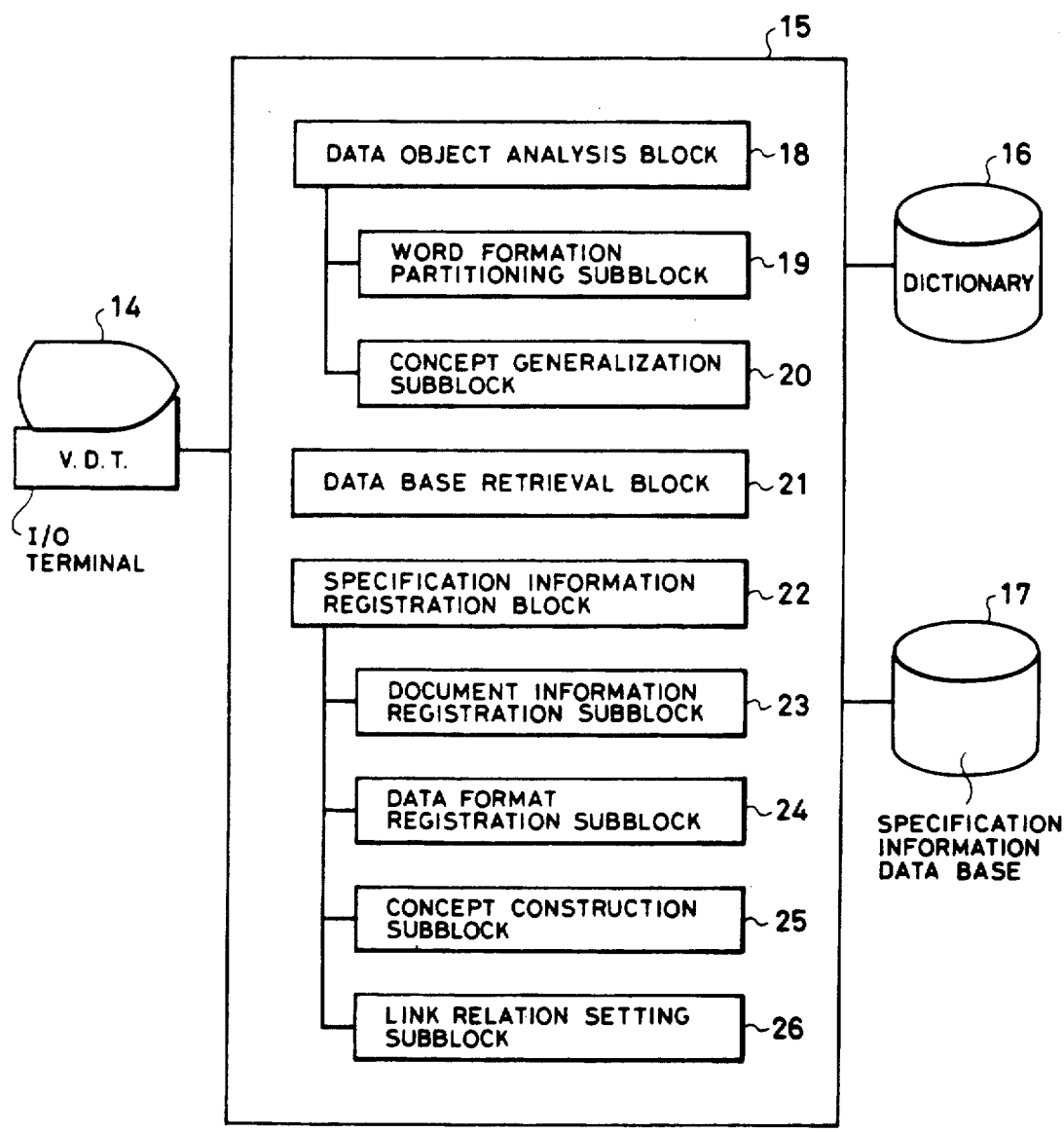
FIG. 2 is a block diagram showing the structure of the system.

A first description will be made upon the registration of specification information according to a first embodiment of the present invention. FIG. 2 is a block diagram showing the overall structure of the present embodiment. In FIG. 2: reference numeral 14 denotes an I/O terminal equipped with an input keyboard and an output display; numeral 15 a computing processor; numeral 16 a dictionary data base; and numeral 17 a specification information data base.

The computing processor 15 is constructed therein of: a data object analysis block 18 composed of a word formation partitioning subblock 19 and a concept generalization subblock 20; a data base retrieval block 21; and a specification information registration block 22 composed of a document information register subblock 23, a data format registration subblock 24, a concept construction subblock 25 and a link relation setting subblock 26.

Figure 1:
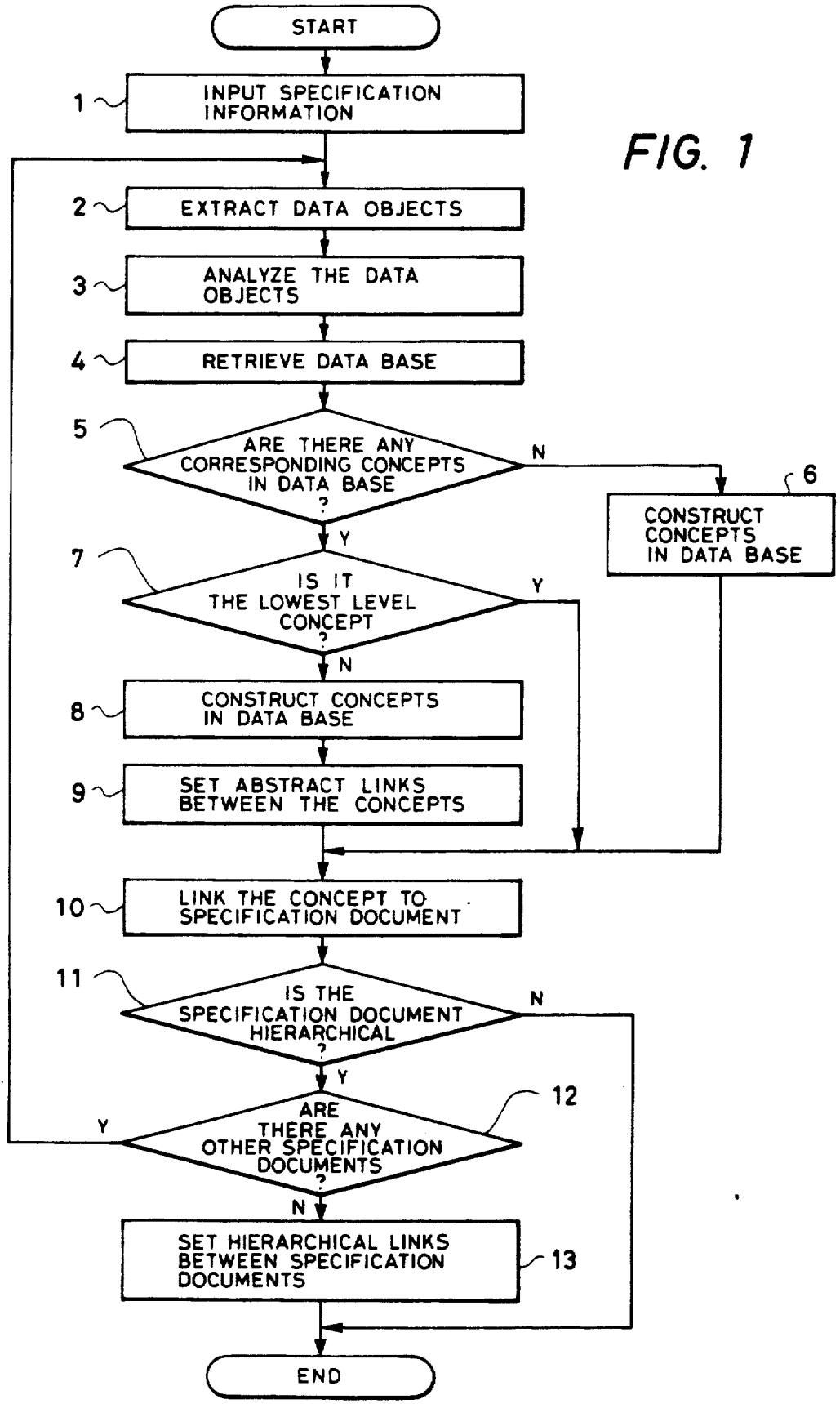
FIG. 1 is a processing flow chart showing a specification information registering system according to one embodiment of the present invention.

FIG. 1 is a processing flow chart of the structure shown in FIG. 2. The operations of the present embodiment will be described in the following with reference to FIGS. 1 and 2.

First of all, a specification information to be newly registered is inputted at a step 1, and its data objects are extracted at a step 2. The data objects are the document names except for their operation names, in case the specification information is the document information, and the data names in case that information is the data specification.

Next, at a step 3, the data objects are analyzed and generalized. At a step 4, the closest data object concept is retrieved from the existing data base. Incidentally, the existing data base is assumed to have the structure, as will be described with reference to FIGS. 3 and 4.

This retrieval of the data object concept is performed by the method, in which the data object extracted from the specification information to be registered is partitioned into short words in accordance with the noun dictionary in the dictionary data base and in which the specification information data base is retrieved, while reducing the limiting phrases of the data object one by one to stepwise generalize with the assumption that those short words be the limiting phases, thereby to select the data object concept which matches at the most lowest level of generalization.

In this retrieval, the words in the data object may be replaced by more general words by the use of the synonym dictionary in the dictionary data base so that the data object having different texts but identical meanings can be selected.

As a result, if a corresponding data object concept is not found at a step 5, this means that the registered specification has no relation with the specification to be newly registered. At a step 6, a data object concept corresponding to the specification information to be registered is constructed independently of the existing data object concept. At a step 10, this data object concept is linked to the specification information.

If the corresponding data object concept is found at the step 5, its position is judged at a step 7. If the data object concept is at the lowest level, it is directly linked to the specification information. Otherwise, the lowest level data object concept is linked only to the specification information. Therefore, the data object concept is constructed at a step 8 like the step 6, and an abstract link is set between the data object concepts of the steps 5 and 8 at a step 9. At the step 10, the data object concept constructed is linked to the specification information.

In the method of registering the specification information for the case of the document information, the operation name of the document information is written in the column of operation names of the concept having identical data objects, and its portion is linked to the document information through a concept expression link. In the case of the data specification, the data objects of the concepts having identical data objects and the data specification are directly linked through the concept expression link.

Next, it is judged at a step 11 whether or not the specification document is hierarchical. If NOT, the program is ended. If YES, it is judged at a step 12 whether or not there are any other specification documents. If YES, these specification documents are repeatedly processed at the steps 2 to 12. When all the specification documents are registered, the program is ended by setting the hierarchical links at a step 13.

In the data specification registering case, the method of setting the hierarchical links assumes that the hierarchical relations of the data specifications and the corresponding data object concepts be identical. In the case of the document information registrations, the hierarchical relations of the documents are not identical to those of the data objects because of the processed partitioning. In case the upper level data object concepts have the hierarchical relations, therefore, it is assumed that they have hierarchical relations with the lower data object concepts.

The processing procedure of the present embodiment has been described hereinbefore.

Next, the procedure for registering the document information will be described by way of simple example with reference to FIG. 3.

Figure 3:
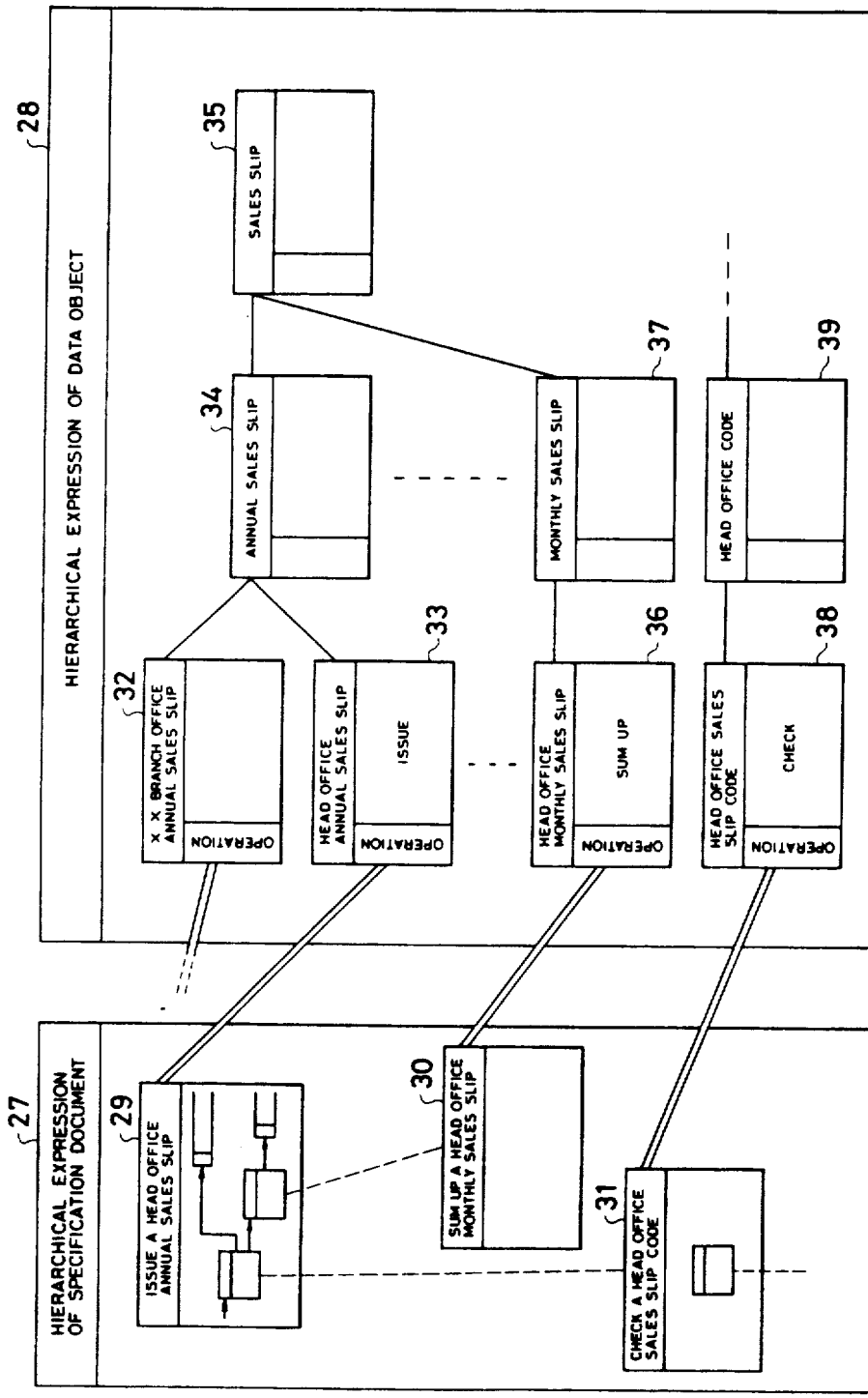
FIG. 3 is a block diagram showing one example of document information in a specification information data base.

FIG. 3 shows one example of the document information in the specification information data base. In FIG. 3, reference numeral 27 denotes a hierarchical expression of the specification document, and numeral 28 denotes a hierarchical expression of the data objects. These expressions 27 and 28 provide the net works of the document information and the data object concept, respectively. Incidentally, numerals 29 to 31 denote the hierarchical document informations to be newly registered, and numerals 32 to 39 denote the existing data object concepts.

Moreover: double solid lines indicate the relation between the specification document and the data object; single solid lines denote generalization links; and broken lines denote partitioning links.

First of all, in order to register the document information 29, the data object of "head office annual sales slip" is issued, and the hierarchical expression of data object 28 is retrieved to find the data object concept 33. Then, the operation name "issue" of the document information 29 is written in the operation column of said data object 33 to link the document information 29 and the data object 33.

Likewise, the document information 30 and the data object 36, and the document information 31 and the data object 38 are subsequently linked. Then, the registration is ended by setting the partitioning links between the document informations 29 and 30, 31.

In the case to be described, the data objects 33, 36 and 38 are not registered in the hierarchical expression of data objects 28.

First of all, in the registration of the document information 29, nothing corresponds to the hierarchical expression of data object 28 in the aforementioned "head office annual sales slip", and a retrieval is made in the one-level generalized "annual sales slip" to discover the data object 34 in the hierarchical expression 28.

Since, however, the data object 34 is not at the lowest level, it cannot be directly linked to the document information. Therefore, the data object 33 of the concept "head office annual sales slip" of the aforementioned data object 34 is constructed and linked to the aforementioned data object 34 through the generalization link. Like the above, the operation name is then written and linked to the document information 29 through the concept expression link. The document informations 30 and 31 are likewise processed to construct and register the data objects 36 and 38.

Moreover, the hierarchical links are set between the document informations 29 and 30, 31, and the relations among the data objects 33, 36 and 38 are then examined. Since the data objects 34 and 37 at the higher levels than those of the data objects 33 and 36 are linked through the hierarchical links, these links are set between the data objects 33 and 36, too. Incidentally, no hierarchical link is set at the data object 38 because the data objects at higher levels than that of the data object 38 have no relation with the data objects 33 and 36.

The registrations are ended when the result similar to the foregoing example is obtained by the processing procedure described above.

Next, the procedure of registering the data specifications will be described in connection with a simple example with reference to FIG. 4.

Figure 4:
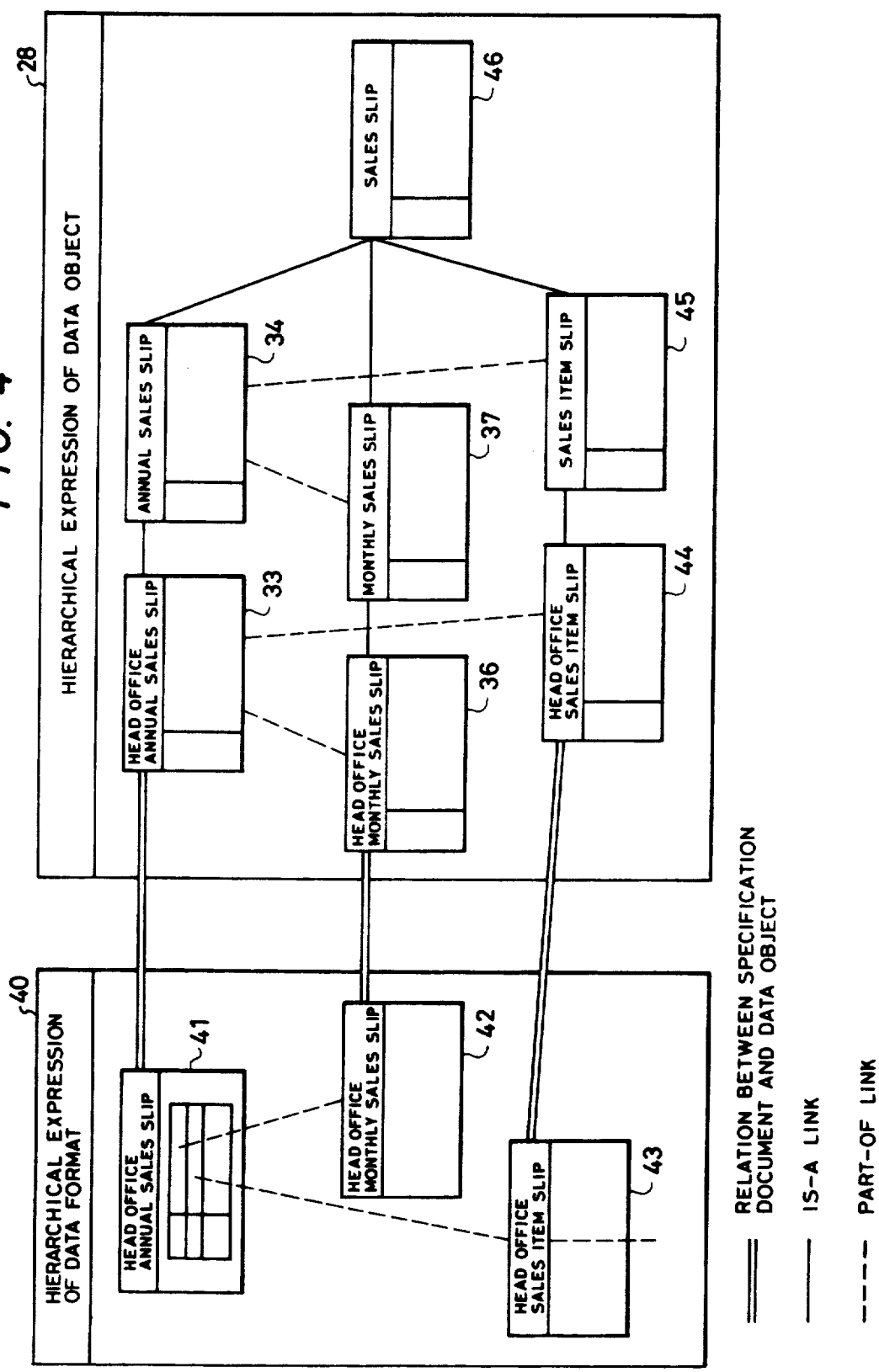
FIG. 4 is a block diagram showing one example of the data specification in the specification information data base.

FIG. 4 shows one example of the data specification in the specification information data base. IN FIG. 4, reference numeral 40 denotes the hierarchical expression of data format, which provides the network of the data specification. Numeral 28 denotes the same hierarchical expression of data object as the preceding one shown in FIG. 3.

Here, numerals 41 to 43 denotes hierarchical data specifications to be newly registered, and numerals 33, 34, 36, 37 and 44 to 46 denote the existing data objects.

In order to register the data specification 41, the hierarchical expression of data object 28 is first retrieved with the data name of "head office annual sales slip" to discover the data object 33, and the data specification 41 and the data object 33 are linked through the concept expression link. Likewise, the data specification 42 and the data object 36, and the data specification 43 and the data object 44 are linked through the concept expression links. Moreover, the registrations are ended by setting the hierarchical links between the data specifications 41 and 42, 43.

Next, the description will be made upon the case in which the aforementioned data objects 33, 36 and 44 are not registered in the hierarchical expression 28.

First in the registration of the data specification, the data object 34 in the hierarchical expression 28 is discovered, as has been described in connection with the case of the document information, by retrieval with the one-level generalized "annual sales slip". However, said data object 34 cannot be directly linked to the data specification because it is not at the lowest level.

Therefore, the data object 33 called the "head office annular sales slip" specified from the aforementioned data object 34 is constructed and linked to the data object 34 through the generalization link. Like the above, moreover, the operation name is written in and linked to the data specification 41 through the concept expression link. The data specifications 42 and 43 are likewise processed to construct and register the data objects 36 and 44. Moreover, the hierarchical links are set between the data specifications 41 and 42, 43 and then between the data objects 33 and 36, 44.

Then, the same results are obtained to end the registrations.

Moreover, let the case be considered in which none of the data objects 34, 37 and 45 are in the hierarchical expression 28. When in the registrations of the data specifications 41 to 43, the data object 46 is selected for all after the two-step generalization. Then, the lowest-level data objects 33, 36 and 44 specified from the data object 46 are constructed and are directly linked to the data object 46, but the data objects 34, 37 and 45 are not constructed. Therefore, this case eliminates the data objects 34, 37 and 45 from FIG. 4.

According to the embodiment thus far described, there can be attained effects that the most proper position for newly registering a specific information can be discovered by systematically retrieving the existing hierarchical expression, and that the document information and the data specification can be automatically registered in the data base by constructing the hierarchical expression, if necessary, and by setting the link relations.

Next, the retrieval keyword extraction according to a second embodiment of the present invention will be described in the following.

Figure 5:
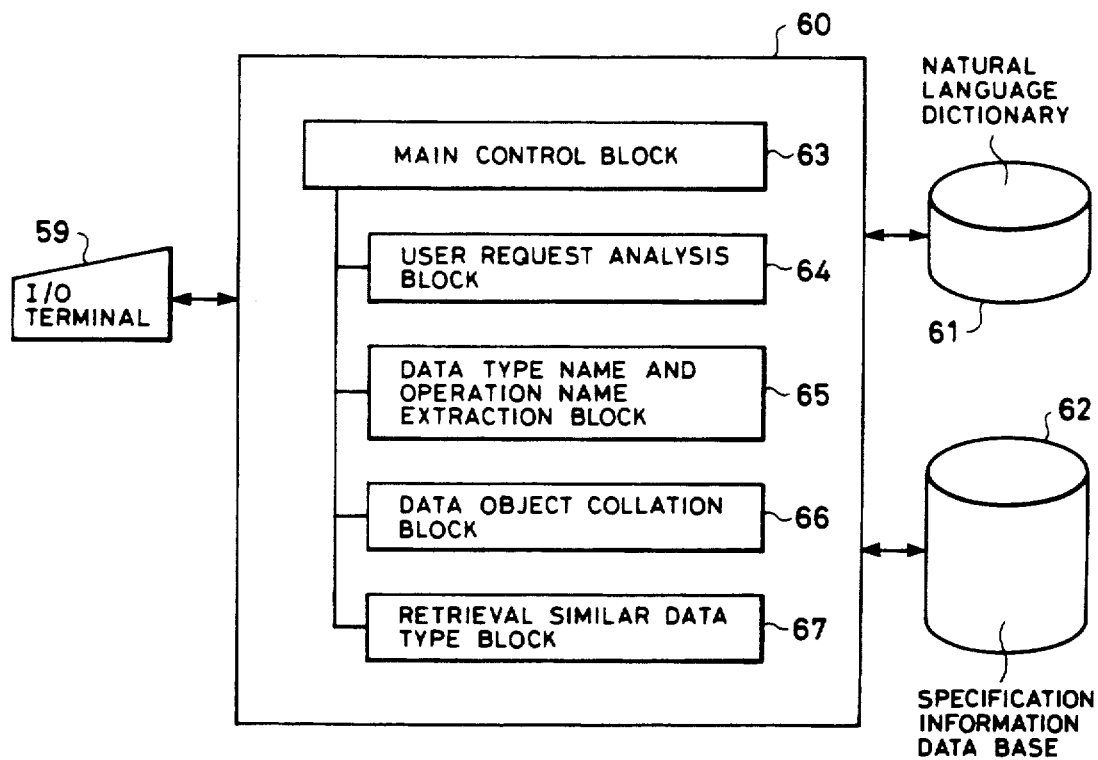
FIG. 5 is a block diagram showing the structure of a retrieval keyword extraction system according to a second embodiment of the present invention.

FIG. 5 is a block diagram showing the overall structure of the present embodiment. In FIG. 5: reference numeral 59 denotes an I/O terminal equipped with an input keyboard and an output display; numeral 60 a computing processor; numeral 61 a natural language dictionary; and numeral 62 a specification information data base. In the above-specified computing processor 60: reference numeral 63 denotes a main control block for the main control from the analysis of a user request to a software specification and a program retrieval; numeral 64 a user request analysis block for receiving a retrieval request sentence inputted by a user to make a natural language analysis by using the natural language dictionary 61; numeral 65 a data type name and operation name extraction block for extracting the data type name and operation name from the aforementioned retrieval request sentence; numeral 66 a data object collation block for collating the data type name obtained by analyzing the aforementioned retrieval request sentence and the data type name in the specification information data base 62; and numeral 67 a retrieval similar data type block for retrieving the data type at a lower level in generalization from the data types found in the aforementioned data object collation block 66, to retrieve the corresponding expression type.

Incidentally, the collation by the data object collation block 66 is constructed to make a collation with the upper-level data type through the concept generalization data link from the data at the terminal end. Moreover, the aforementioned data object collation block 66 is used, too, when the detailed data type is retrieved through the partitioning data link in the total-partial relation of the data type.

The expression of the data structure is made by using the S formula of the LISP or a kind of computer language. In the expression, different values are parenthesized by < > according to the individual data.

```
(Natural Language Dictionary
  (Verb <Name>
    (Objective Case (Postpositional Word <Name> ---)
    (Characteristics <Characteristics> ---)
    .
    .
    )
    .
    .
  (Noun <Name>
```

```
    (Characteristics <Meaning Identity> ---)
    (Abstract Noun <Abstract Noun> ---)
    .
    .
    .
  )).
```

Figure 7:
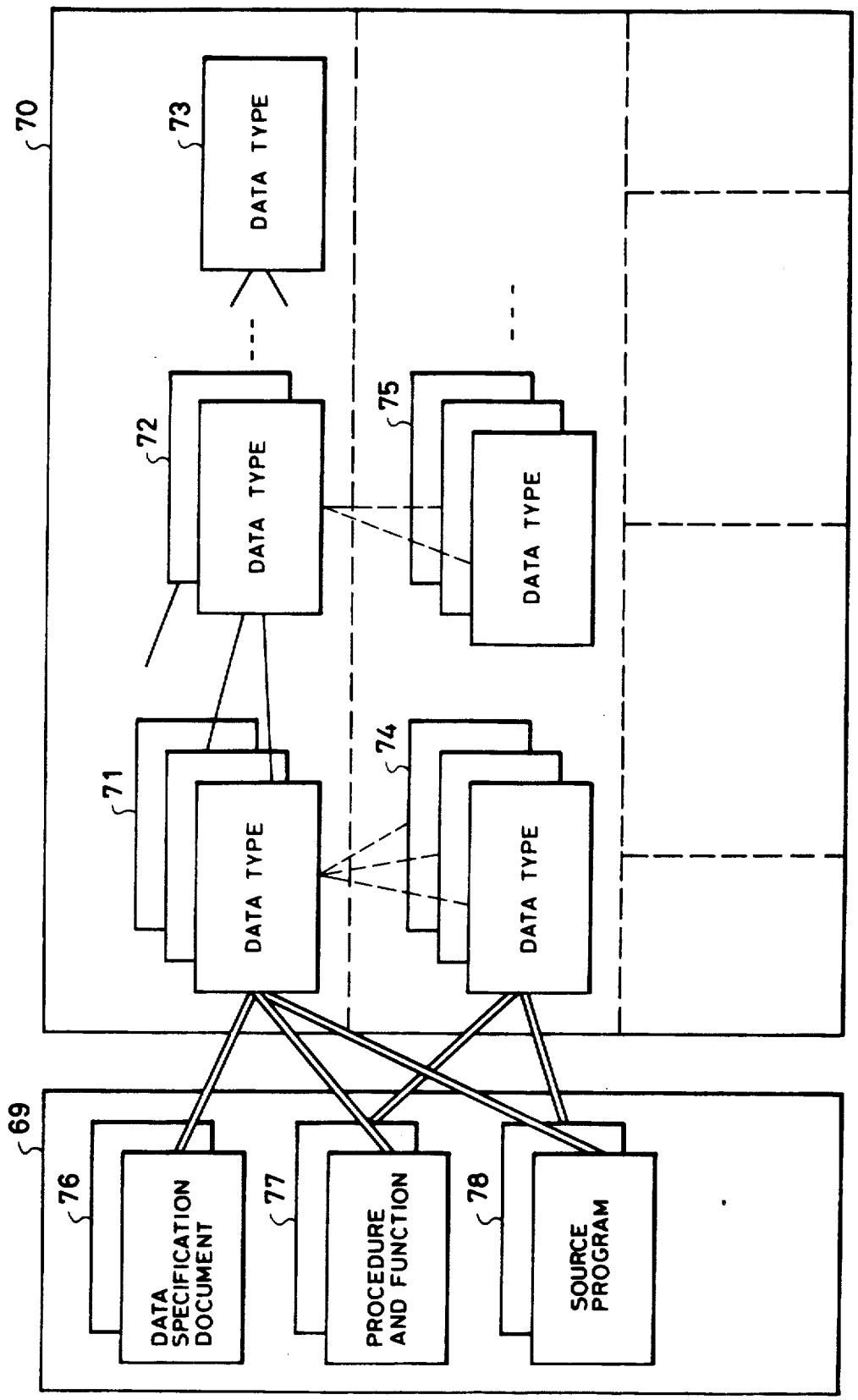
FIG. 7 is a block diagram showing an example of the structure of a concept data dictionary.

An example of the aforementioned specification information data base 62 is constructed by the following construction, as shown in FIG. 7.

```
(Specification Information Data Base
  (<Data Type Name>
    (Abstracting Data link
      (Upper-Level Link (<Name>
                         <Link Destination>) ---)
      (Lower-Level Link (<Name>) ---)
                         <Link Destination>) ---)
    (Partitioning Data Link
      (Upper-Level Link (<Name>
                         <Link Destination>) ---)
      (Lower-Level Link (<Name>
                         <Link Destination>) ---)
    (Expression Link <Specification -
                     Source Program Name> ---)
    (Data Specification Link <Specification Name> ---)
    (Operation <Name> ---))
    .
    .
    ).
```

FIG. 7 shows the relations between an index block of the specification information data base and the expression type of the specification/source program of the software as the document. In FIG. 7: reference numeral 69 designates the expression type; numeral 70 the index type of the specification information data base; numeral 71 the data type; numeral 72 a data type at a level higher than the data type 71; and numeral 73 a data type at level higher than the data type 72. The data types 71 and 72, and 72 and 73 are linked through abstracting data links (as indicated by single solid lines).

Moreover, numeral 74 denotes a data type at a level lower than the aforementioned data type 71, and numeral 75 denotes a data type at a level lower than the data type 72. The data types 71 and 74, and 75 and 72 are linked through partitioning data links (as indicated by broken lines). Incidentally: numeral 76 denotes a data specification document in the expression type; numeral 77 a procedure and function explanation of the software; and numeral 78 a source program. The data type 71 or 74 and the data specification document 76, or the procedure and function explanation 77 or the source program 78 are linked through expression type links (as indicated by double solid lines).

From the standpoint that an analysis is made to extract the data type name and the operation name from the retrieval request sentence of the free type inputted by the user, the structure of the natural language sentence without any limitation is grasped, as follows. Incidentally, the following description is made by the BNF method:

```
<Retrieval Request Sentence> ::= { <Retrieval Request
                                    Syntax>}
<Retrieval Request Syntax> ::=  <Active Mode Retrieval
                                 Request Syntax> |
                                <Passive Mode Retrieval
                                 Request Syntax> |
```

```
                            <Skipped Syntax>
<Active Mode Retrieval Request Syntax> :: =
                            <Skipped Text>
                            <Data Type Name>
                            <Skipped Text>
                            <Active Mode Operation Name>
                          { <Skipped Text>
                            <Active Mode Operation Name> }
                          { <Skipped Text> }
<Passive Mode Retrieval Request Syntax> :: =
                            <Skipped Text>
                            <Data Type Name>
                            <Passive Mode Operation Name>
                          { <Skipped Text>
                            <Passive Mode Operation Name> }
                          { <Skipped Text> }
                          | <Skipped Test>
                            <Data Type Name>
                            <Skipped Text>
                            <Passive Mode Operation Name>
                          { <Skipped Text>
                            <Passive Mode Operation Name> }
                          { <Skipped Text> }
<Data Type Name > :: = <Data Noun>
<Active Mode Operation Name> :: = <Active Mode Verb>
<Passive Mode Operation Name> :: = <Active Mode "Mizen" Verb>
                                   <Passive Auxiliary Verb>
<Skipped Text> :: = { <Unnecessary Word> }
<Skipped Syntax> :: = <Unnecessary Word> { <Unnecessary Word> }
```

Next, the operations of the present embodiment will be described in the following with reference to the operation flow chart shown in FIG. 6.

First of all, at a step 51, a user retrieval request syntax is inputted. This input is the natural language syntax having no limitation.

Next, it is judged at a step 52 whether or not the analysis of the user retrieval request sentence has been completed. If YES, the control is transferred to a step 56. If NO, the control is transferred to a step 53.

At the step 53, the retrieval request syntax inputted at the step 51 is analyzed by using the natural language dictionary 61. The fundamental analyzing operation is to search the retrieval request syntax sequentially from the tail to the head. If a candidate for the <active mode operation name> is in this search, the first "<data noun>" portion contained in the preceding portion of the same syntax is sought for, and the <data noun> is used as the data type name whereas the ending form of the <active mode operation name> is used as the operation name. If a candidate for the <passive mode operation name> is, the first "<data noun>" portion contained in the preceding portion of the same syntax is sought for, and the <data noun> is used as the data type whereas the <passive mode operation name> is used as the operation name. Other cases wholly uses the <skipped syntax>, including the case in which no noun is found as the data type name.

Next, at a step 54, the data type name and the operation name are extracted from the analytical result. Next, at a step 55, the data type in the specification information data base is collated to the data type name and the operation name extracted at the step 56, when the analysis of the next retrieval request syntax in the retrieval request sentence is completed.

Next, at a step 57, the software specification or program (document) related with the collation data type through the expression type link is retrieved. At a step 58, the specification document and the source program are modified and used.

The program (document) is displayed and is selected and confirmed by the user. Next, the editing mechanism is modified and used, if necessary.

By the operations of the aforementioned steps 51 to 58, it is possible to obtain the specification of software or source program the user requires.

The present invention will be described in the following in a concrete example. Let the following retrieval request sentence be considered as an example.

"Several containers are brought every day into a warehouse of a liquors sales company. The contents are bottled alcoholic liquors, and one container can load as many as ten brands together. The handled brands are about 200 kinds. The warehouse keeper receives and stores the containers as they are, and hands the shipping note to the receptionist. The cargo is shipped out in accordance with the indication of the receptionist. The cargo is neither repacked nor stored in another place. - - - " (which is quoted from "Design of Common Problems by New Programming paradigm" written by Nimura et al., INFORMATION PROCESSING, vol. 26, No. 5).

Figure 6:
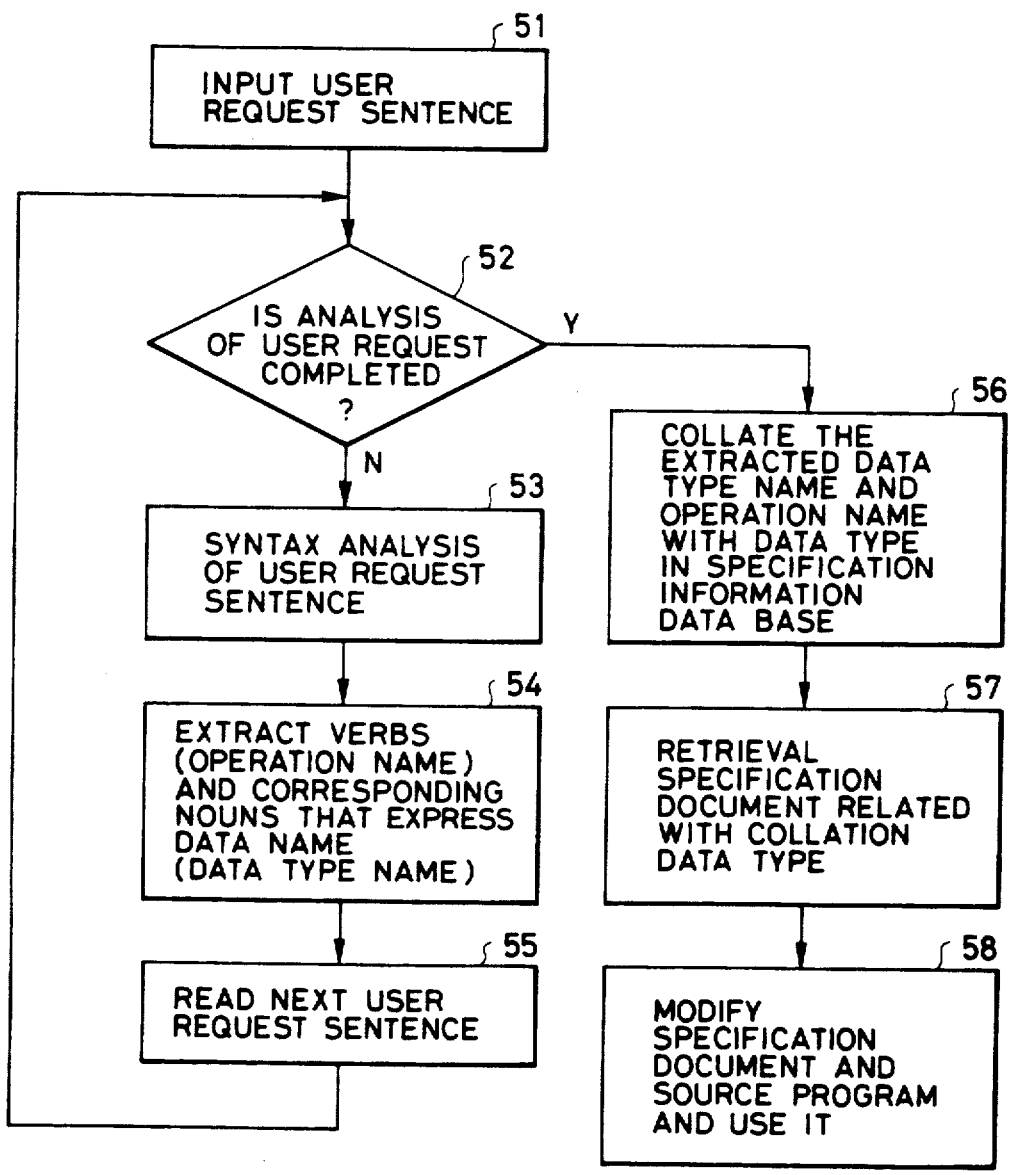
FIG. 6 is a processing flow chart of the retrieval keyword extraction system.

By the operating procedure of FIG. 6 according to the syntax rules of the aforementioned retrieval request sentence, the following data type names and operation names can be extracted:

| <Data Type Name> | <Passive Mode Operation Name> |
|---|---|
| Container | Brought in |
| <Data Type Name> | <Active Mode Operation Name> |
| Container | Received |
| <Data Type Name> | <Active Mode Operation Name> |
| Shipping Note | Handed |
| <Data Type Name> | <Active Mode Operation Name> |
| Stored Cargo | Shipped |

The embodiment described above has the following effect: If a retrieval request sentence or a natural language syntax having no limit is inputted, it is possible to extract keywords capable of collating the data type name and operation name which are described in the specification of the software or the source program to be retrieved, merely by a simple syntax analysis without any complicated analysis mechanism such as the meaning analysis.

Next, the retrieval of data base information of the natural language according to a third embodiment of the present invention will be described in the following.

According to the feature of the present embodiment, the information to be stored in the data base is arranged with the frames of the "object" or a data target and the "operation" for processing the object such that the "object" generalized relative to each specific "object" is hierarchized and linked to generally express the objective concept to be handled by the user. For analysis of the natural language inputted, nouns expressing those "object" and "operation" are extracted, and the information is retrieved from the corresponding "object" and "operation" in the data base so that the inputted natural language can be efficiently analyzed to retrieve the information meeting the request of the user.

Figure 8:
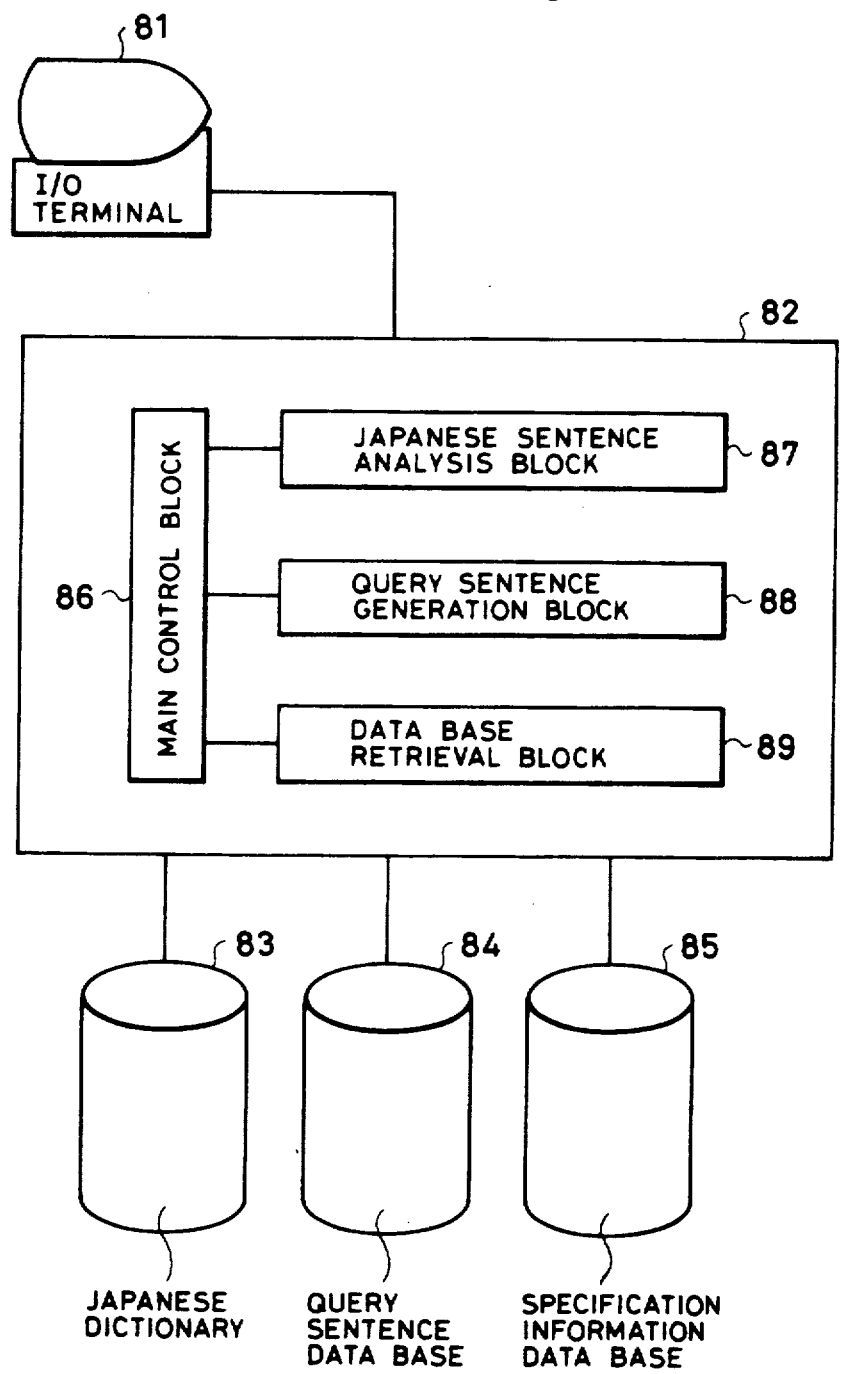
FIG. 8 is a block diagram showing the structure of a system according to a third embodiment of the present invention.

FIG. 8 is a block diagram showing the overall structure of a third embodiment of the present invention. In FIG. 8: reference numeral 81 denotes an I/O terminal having a keyboard and a display; numeral 82 a computing processor; numeral 83 a Japanese dictionary for analyzing a Japanese word inputted; numeral 84 a query sentence data base stored with a query sentence corresponding to the inputted Japanese; and numeral 85 a specification information data base stored with the information of the existing specification.

The aforementioned computing processor 82 is composed of: a main control block 86 for integrating, adjusting and controlling the whole system; a Japanese sentence analysis block 87 for analyzing the Japanese word inputted by the use of the Japanese dictionary; a query sentence generation block 88 for generating a query sentence corresponding to the inputted Japanese word by the use of the query sentence data base; and a data base retrieval block 89 for retrieving the specification information according to the request of the inputted Japanese from the specification information data base.

Incidentally, the aforementioned "object" and "operation" are generally the concepts of the objective and its processing operation and can be so suitably selected by their constructor that the data base may be skillfully used. As a result, those concepts are arbitrary within the range in which the data base can be efficiently used.

Figure 9A:
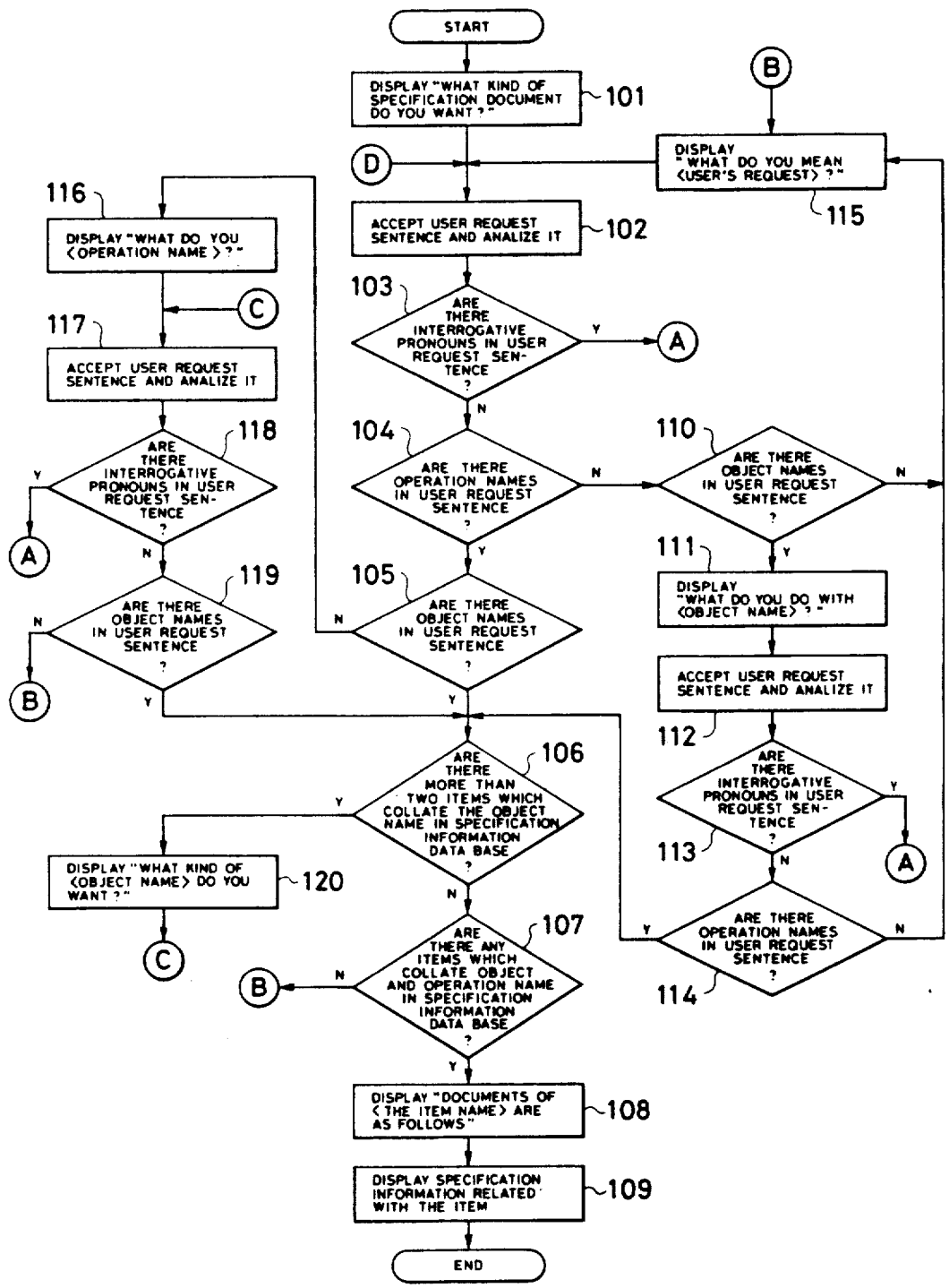
FIGS. 9(A) and 9(B) are processing flow charts of the system of the third embodiment.
Figure 9B:
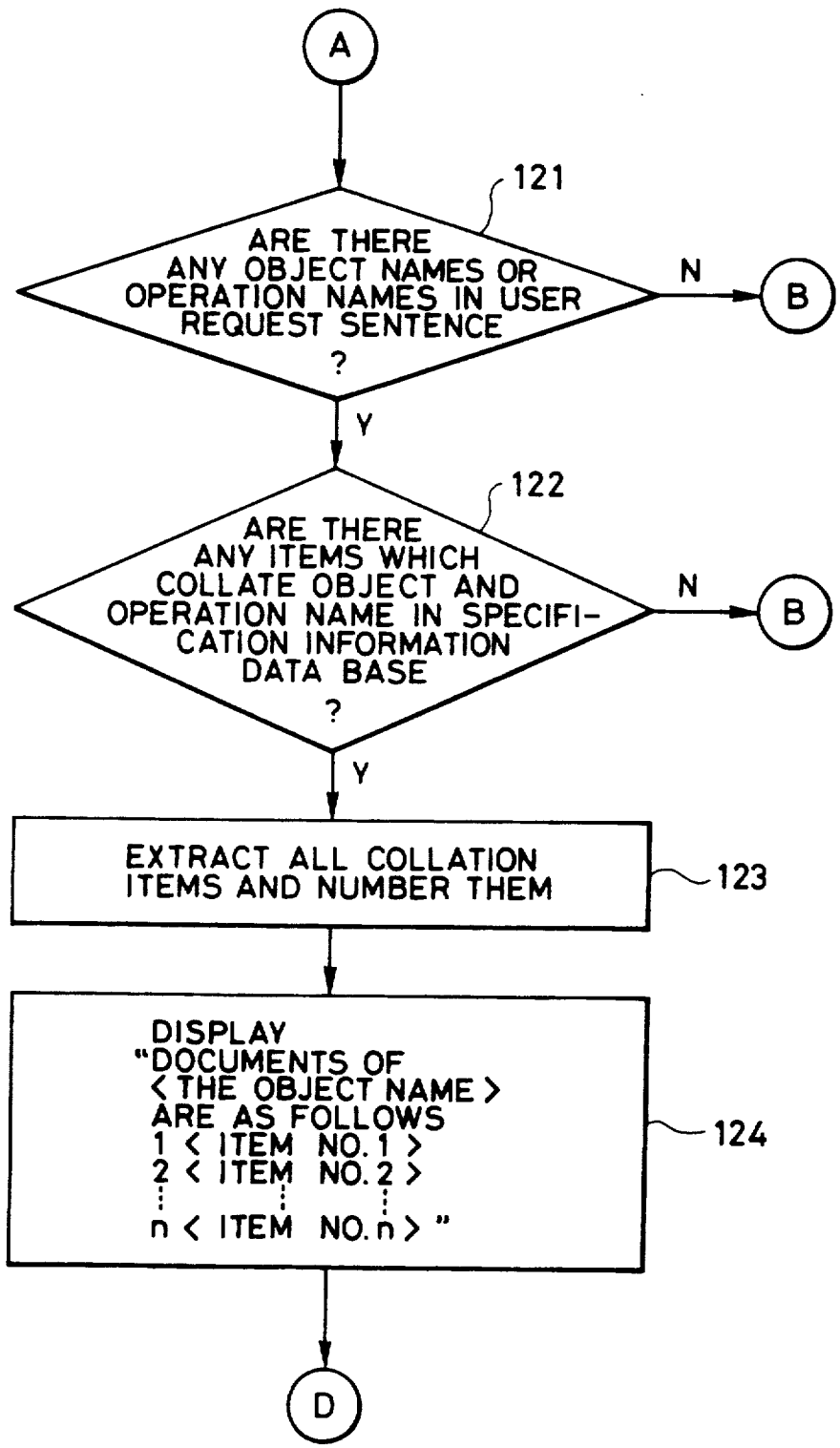

FIGS. 9(A) and 9(B) are flow charts showing the processing procedures of the present embodiment. These processing procedures will be described in detail in the following in connection with the examples shown in FIGS. 10 to 14.

Figure 13:
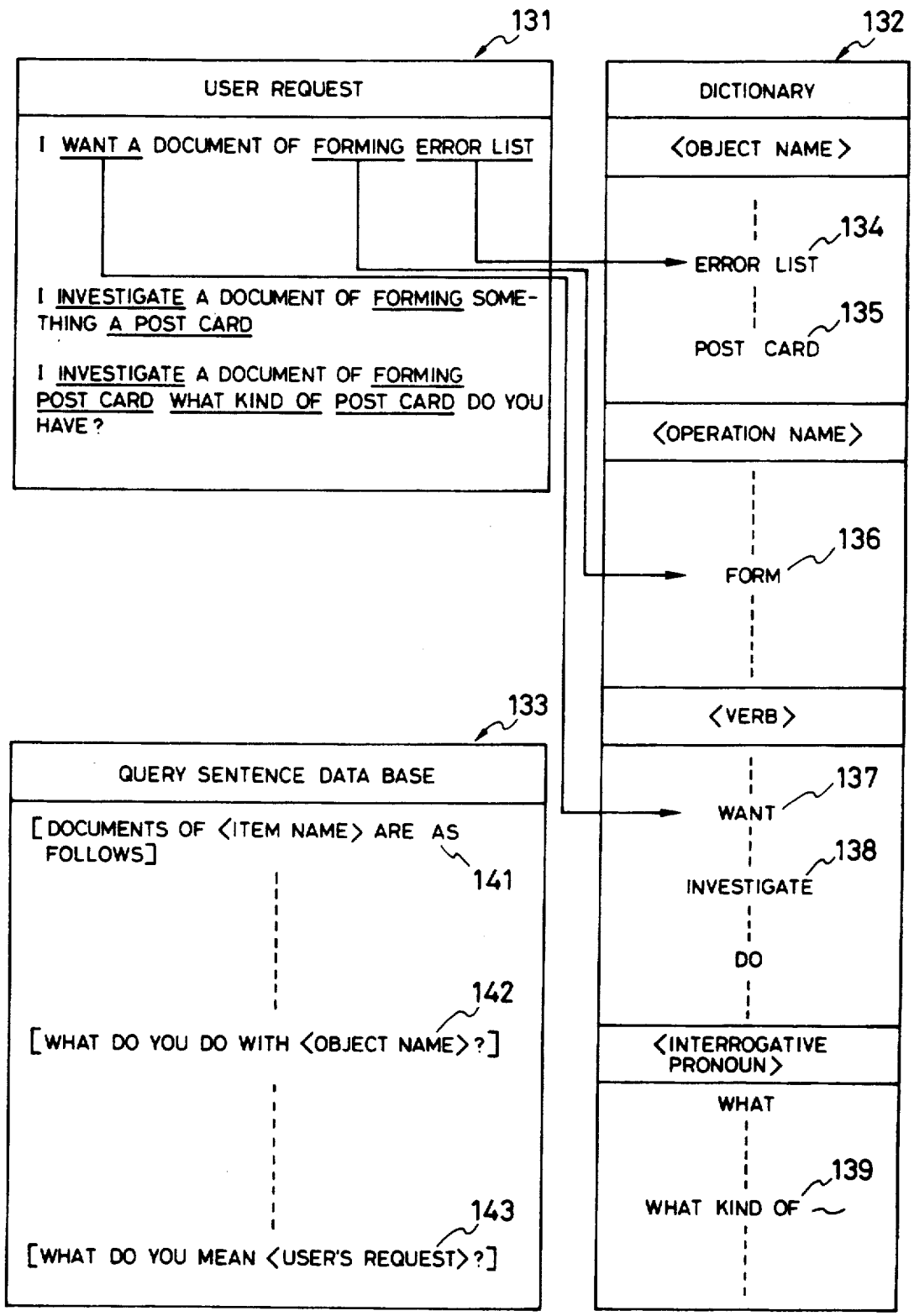
FIG. 13 is a diagram showing the structures of a Japanese dictionary and a query sentence dictionary in the third embodiment.
Figure 14:
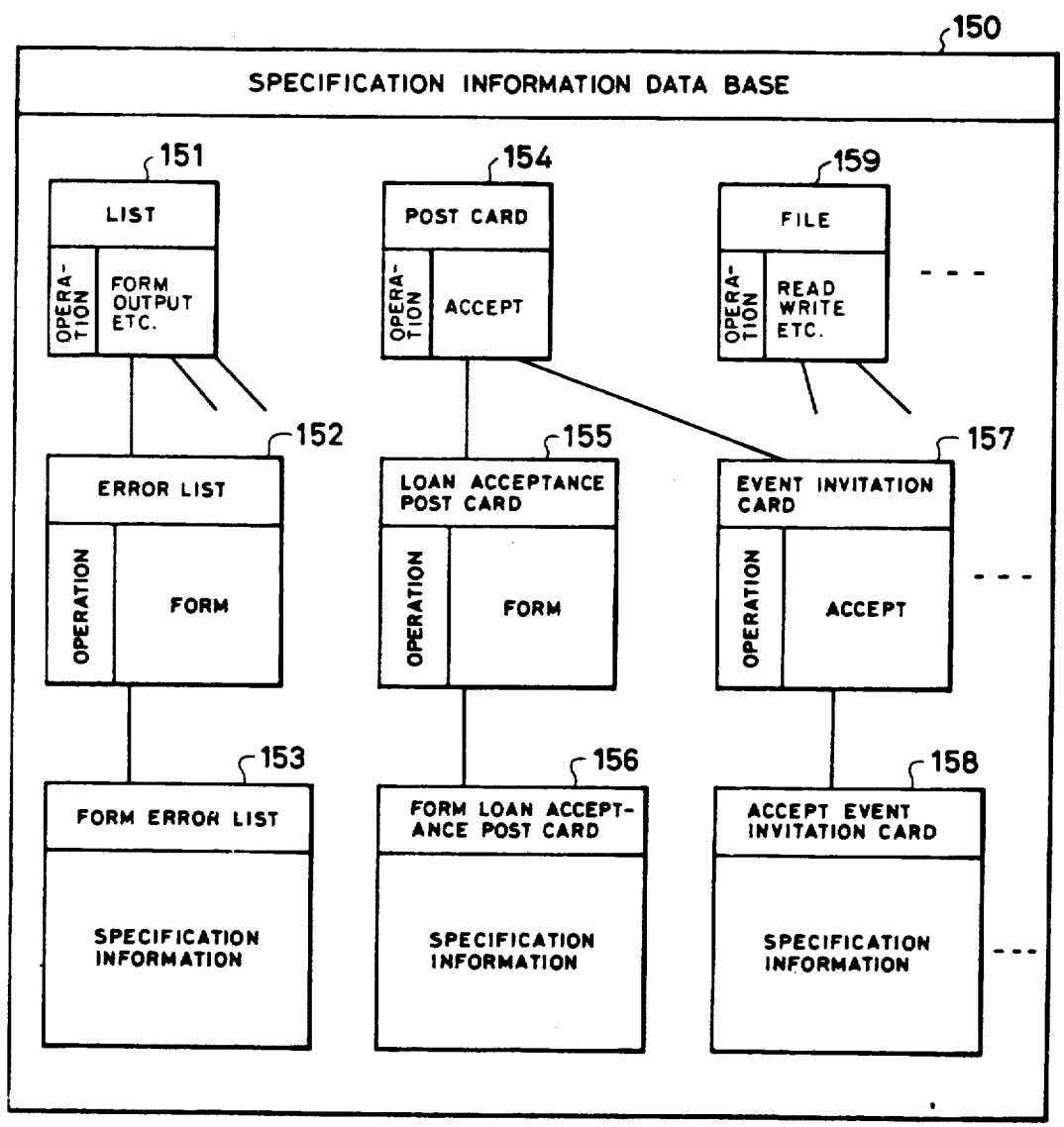
FIG. 14 is a block diagram showing one example of the content of a specification information data base.

First of all, a Japanese dictionary 132 and a query sentence dictionary 133 of FIG. 13 and a specification information data base 150 of FIG. 14 are prepared before the system of the present embodiment is operated. The above Japanese dictionary 132 is registered with words and phrases necessary for analyzing a Japanese sentence inputted, and the query sentence dictionary 133 is registered with a query sentence necessary for the inputted Japanese query.

Here are as the references for sorting the words and phrases in the Japanese dictionary 132 an object name, an operation name and so on, the former of which designates the data to be handled in the specification information whereas the latter of which designates the name indicating the processing operation for the data.

In the specification information data base, as shown in FIG. 14, the data handled as the specification information are used as the object names, and the names indicating the processing operation of the data are used as the operations and stored together with the object names in one frame such that each of the nouns indicating the operations of the object names is made to correspond to the specification information and is linked.

As a result, the specification information can be retrieved if the object name and the operation are designated. Moreover, the objects generalized and partitioned from the objects are placed at higher levels in the hierarchy structure.

After the Japanese dictionary 132, the query dictionary 133 and the data base 150 have been prepared, as described above, the user of the system has a dialogue through the natural language with the system through the terminal 81 to retrieve the specification he seeks for. An example of the dilogue between the user and the system is shown in FIGS. 10 to 12.

FIGS. 10 to 12 are the Japanese dialogues between the user and the system, which are displayed in the display of the terminal 81. In these Figures, the sentences following C> are those displayed by the system, and the sentences following U> are the input ones which are inputted by the user from the terminal 81.

First of all, FIG. 10 will be described in the following. When the system is started, the processing of a step 101 of the flow charts shown in FIGS. 9(A) and 9(B) is performed to display "What kind of specification document do you want ?", as at a step 161 in FIG. 10, awaiting the input of the user.

If the user inputs "I want a document of forming error list." in response to this, as at a step 162 in FIG. 10, the system examines in the aforementioned Japanese sentence analysis block 87 whether or not any word coincident with the word registered in the Japanese dictionary 132 in the Japanese sentence inputted.

The Japanese sentence analysis block 87 first examines the verb and then the noun to be noted in relation with the verb. In this case, on the basis of the relation of a verb "want" 137 shown in FIG. 13, an object noun (134 in FIG. 13) of the "error list" and an operation noun (136 in FIG. 13) of the "form" are extracted (at steps 104 and 105) from the phrase "a document of forming error list".

Then, an item coincident with that phrase is sought for in the specification information data base 150 of FIG. 14 to retrieve the specification information of the "forming error list" indicated the pointer of an object 152 having the object name of the "error list" and the operation of the "forming".

Next, in the query sentence generation block 88, a syntax (141 in FIG. 13) of the "documents of <item name> are as follows" is extracted from the query sentence data base 133, and the object noun "error list" and the operation noun "forming" are inserted into that noun and are displayed (at a step 108), as indicated at 163 in FIG. 10. At a subsequent step 109, the content of the specification information retrieved is presented.

Since, in this case, the object noun and the operation noun coincident with the Japanese dictionary 132 are in the inputted Japanese syntax, the specification information can be instantly retrieved. In case, however, the user inputs a sentence of "I investigate a document of forming something", as indicated at 165 in FIG. 11, the operation noun of "forming" can be extracted, but the object noun cannot.

In this case, the program advances through the steps 104 and 105 of FIG. 9(A) to the processing of a step 116. At the aforementioned query sentence generation block 88, more specifically, "What do you <operation name> ?" (at 142 in FIG. 13) is fetched from the query sentence data base 133, and the word "forming" now extracted is inserted into the <operation name> to display a sentence 166 of FIG. 11.

If the user inputs "I investigate a document of forming post card", on the contrary, the object noun of "post card" is extracted again (at a step 119) from that sentence.

Incidentally, in the specification information data base 150 shown in FIG. 14, there are as the lower-level concept of an object noun 154 of the aforementioned "post card" two post cards, i.e., "loan acceptance post card" 155 and "event invitation post card" 157. In order to determine which of the objects, therefore, the processing from a step 106 to a step 120 is performed. Specifically, an inquiry 168 of "what kind of post card do you want ?" in FIG. 11 is displayed. In response to this, the user inputs "a loan acceptance post card" so that a specification information 156 of "form loan acceptance post card" indicated by the pointer of the object 155 having the object noun of the "loan acceptance post card" and the operation of "form" is retrieved and presented.

The example of the input 165 of the user of FIG. 11 corresponds to the case having the operation noun but not the object noun. In the case having the object noun but not the operation noun, as an input of "a post card" of the user of FIG. 12, on the contrary, the program advances to the steps 104 and 110 of the aforementioned flow chart to perform a step 111. Specifically, an inquiry of "What do you do with the post card ?" of 173 of FIG. 12 is displayed.

If, on the contrary, the user inputs an operation sentence corresponding to some object noun, the operation noun is extracted from the sentence, and the specification information is retrieved from the object noun and the operation noun, as in the foregoing example. In case, however, "What kind of post card do you have ?" is inputted as at 174 in FIG. 12, the processing at a step 113 of FIG. 9(A) and a step 121 of FIG. 9(B) and later is performed because the interrogative pronoun "what" is in the input sentence.

In this case, more specifically, the object noun "post card" is extracted from the input sentence, and all the objects of the lower-level concept than the object 154 of the "post card" in the specification information data base 150 are numbered, in this case, at the object names 155 and 157 of the "loan acceptance post card" and the "event invitation post card" and are displayed as at 175 in FIG. 12.

The embodiment described above can attain the effects that the natural language analysis can be easily accomplished, and that the user can retrieve the specification information he wants with the natural words he is usually using.

In the embodiment thus far described, the natural language is exemplified by Japanese. However, the present invention should not be limited thereto but can be applied to any language having the concepts of the "object" and the "operation". On the other hand, the data base information to be retrieved is examplified by the specification information of the commercial program but may also be any if it has the aforementioned concept of the "object" or "operation" in relation to the information concept stored in the data base.

Next, the automatic program generation by a natural language dialogue according to a fourth embodiment of the present invention will be described in the following.

In this fourth embodiment, program parts are arranged in respect of data and verbs indicating the data processing operation, and those data and verbs are extracted from a natural language sentence inputted to retrieve the corresponding program parts.

Figure 15:
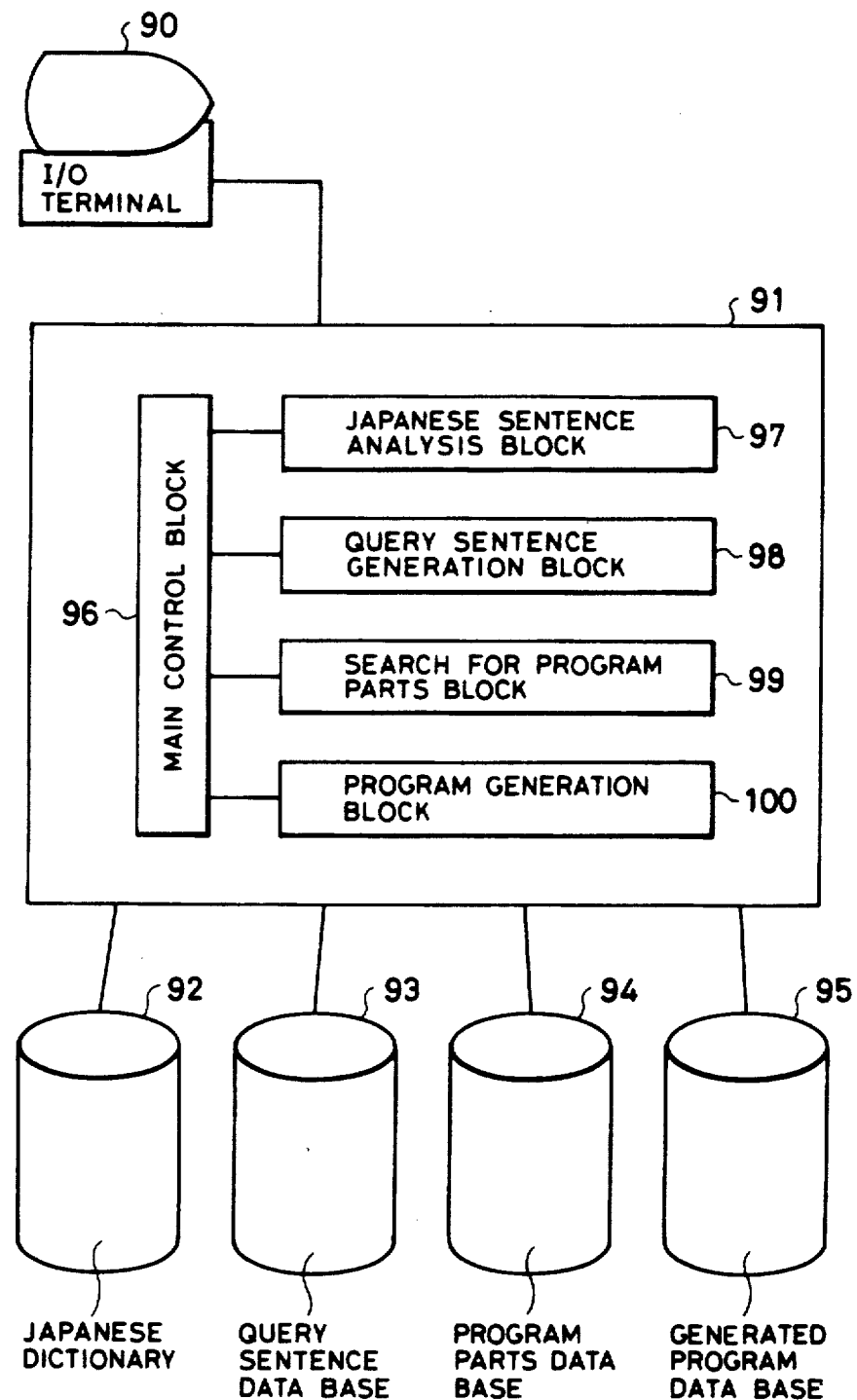
FIG. 15 is a block diagram showing the structure of a system according to a fourth embodiment of the present invention.

FIG. 15 is a block diagram showing the structure of the system according to an embodiment for analyzing the Japanese inputted and holding a diologue to generate a Pascal program. In FIG. 15: reference numeral 90 designates an I/O terminal having a keyboard and a display; numeral 91 a computing processor; numeral 92 a Japanese dictionary for Japanese inputted; numeral 93 a query sentence data base stored with a query sentence corresponding to the inputted Japanese; number 94 a program parts data base stored with program parts; and numeral 95 a generated program data base for storing a generated program.

The computing processor 91 is composed of: main control block 96 for integrating, adjusting and controlling the whole system; a Japanese sentence analysis block 97 for analyzing the Japanese inputted by the use of the Japanese dictionary 92; a query sentence generation block 98 for generating a query sentence corresponding to the inputted Japanese by the use of the query sentence data base; a search for program parts block 99 for searching for the parts conforming to the request specification of the Japanese inputted from the program parts data base 94; and a program generation block 100 for storing the retrieved parts in combination in the generated program data base 95.

Figure 16:
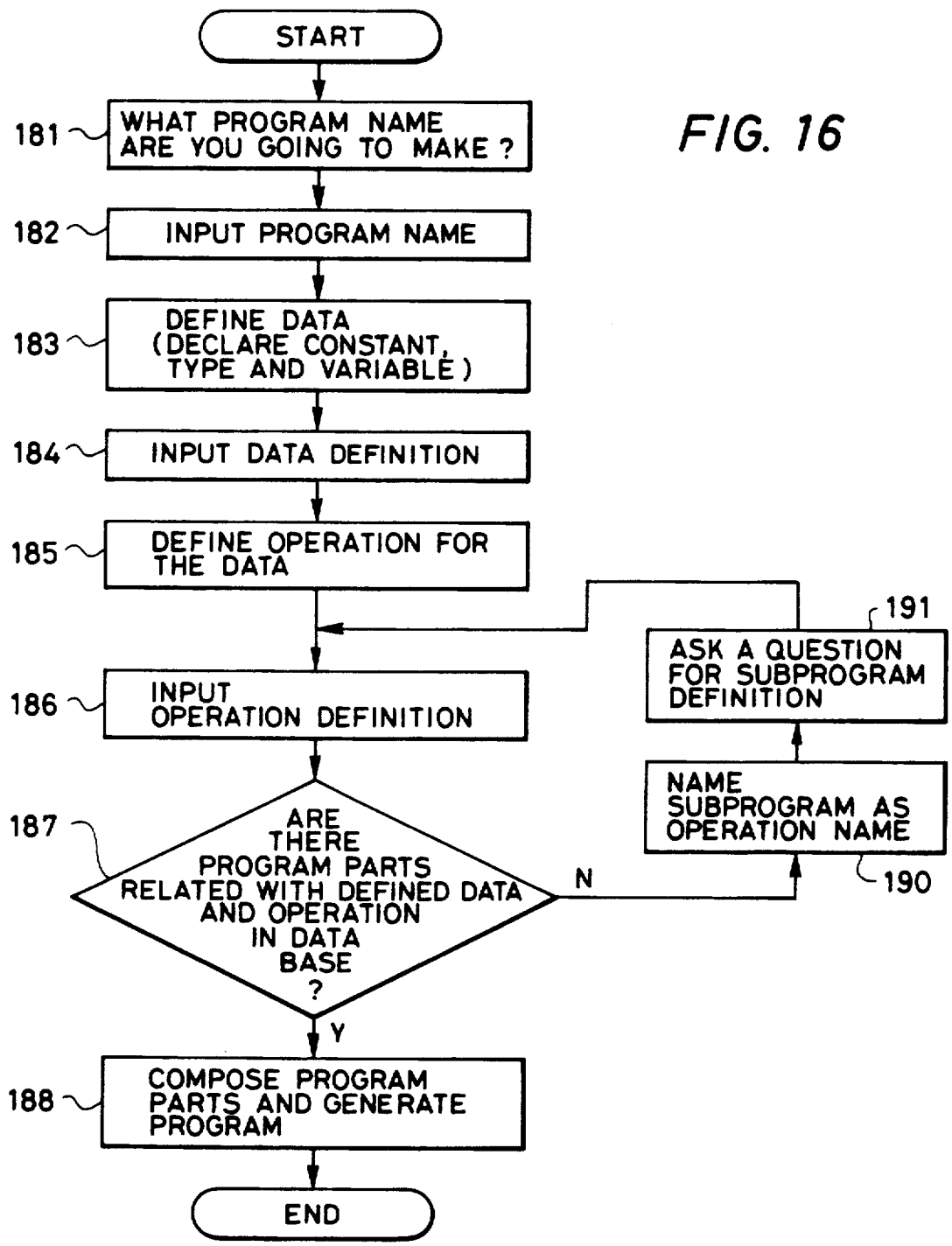
FIG. 16 is a processing flow chart of the system of the fourth embodiment.

FIG. 16 is a flow chart showing the processing procedure of the fourth embodiment. This processing procedure of the flow chart will be described in connection with an example shown in FIG. 17.

The system starts the program with the processing of a step 181 of FIG. 16. This concrete example is shown in the <input> column of FIG. 17. In this example, by the processing of the step 181, the sentence of "What program name are you going to make ?" is displayed to inquire the user the program name. In response to this, the user inputs the name of the program at "XXX", as indicated at 192 in FIG. 17. Then, the system performs the processing of a step 182.

Figure 17:
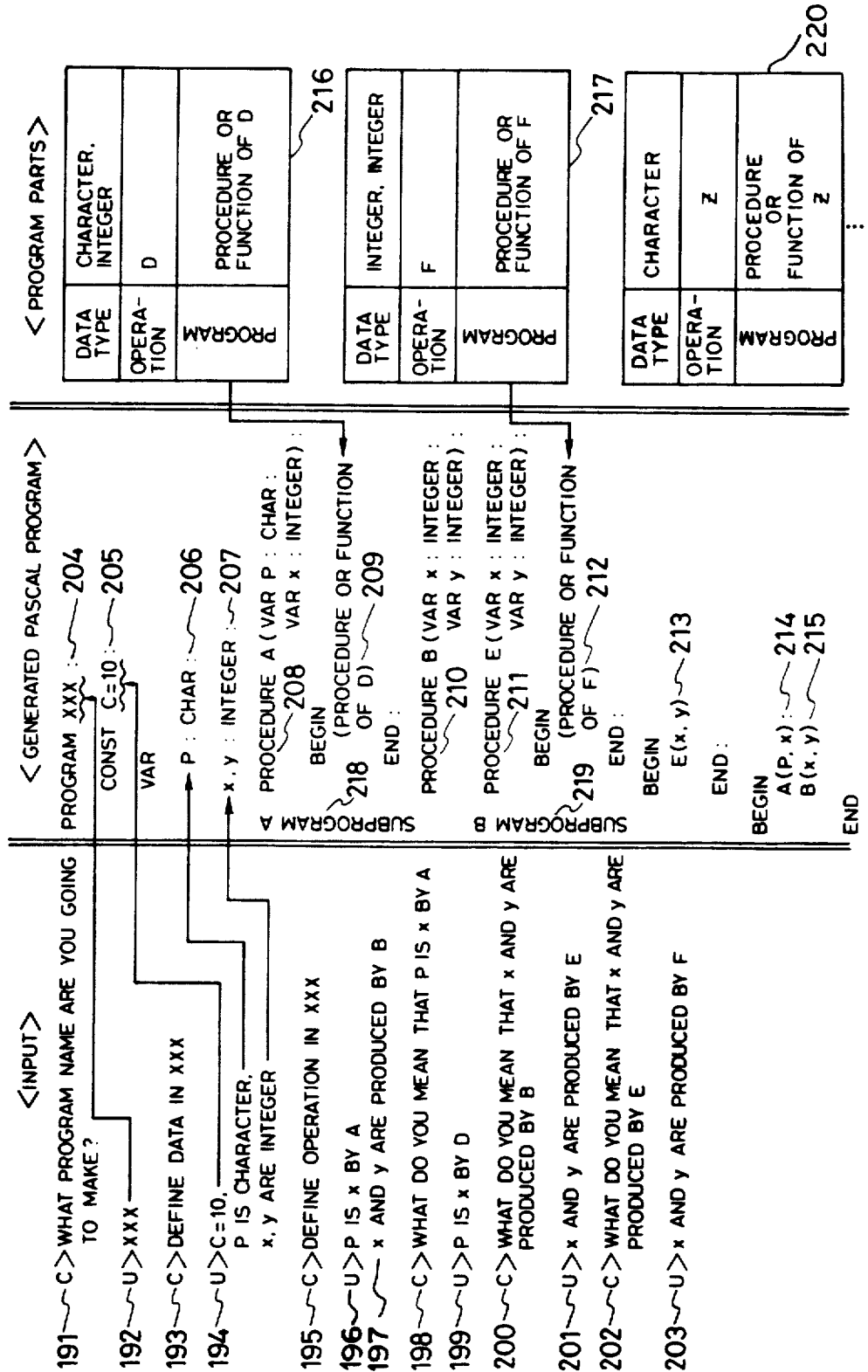
FIG. 17 is a diagram for explaining the operations of the fourth embodiment.

This processing transforms the inputted Japanese into Roman characters as the program name and places it at the head (204 of FIG. 17) of the generated Pascal program. Then, the processing of a step 183 is performed, and a sentence of 193 of FIG. 17 is displayed. If the user inputs, as indicated at 194 in FIG. 17, on the contrary, the system performs the processing of a step 184. This processing is as follows:

(1) The sentence of "<Const> = <Numeral>" or "<Constant> is a constant and a <numeral>" places (at 205 in FIG. 17) the <Constant> = <Numeral> at the Const part of the Pascal program;

(2) The sentence of "<Variable, variable, - - - > is an <integer (Char, real, boolean)>" or "<Variable, - - - >: an <integer (Char, real, boolean)> " places the <Variable, variable, - - - >: <integer (Char, real, boolean)> at the Var part of the Pascal program;

(3) The sentence of "<Variable> is <numeral 1> or more and <numeral 2> or less" places <Variable>: <numeral 1> --- <numeral 2>; at the Var part of the Pascal program;

(4) The sentence of "<Variable> is an array of an n number of <integers (Char, real, boolean)>" places <Variable>: array [1, 2, ---, n] of <integer (Char, real, boolean)>;

(5) The sentence of "<Variable 1> is composed of <variable 2>, <variable 3>, ---, <variable n>" assuming that the <Variable 2>, <variable 3>, ---, <variable n> is defined by the sentence (2) places at the type part of the Pascal program the following items:

```
t <Variable 1> = record
    <Variable 2>: <integer (Char, real, boolean)>;
    <Variable 3>: <integer (Char, real, boolean)>;
    .
    <Variable n>: <integer (Char, real, boolean)>;
and
    End.
```

(6) If the definition of another pointer type or the like is made according to the format of the Pascal program, the definitions of the corresponding type and the variable are placed at the type part and the Var part of the Pascal program.

The analysis of the inputted Japanese of the above items are performed by the aforementioned Japanese sentence analysis block 97, and the sentences either failing to satisfy the conditions (1) to (6) or insufficient therefor have their insufficient information supplemented or their contradictions corrected by inquiring the query sentence generation block 98 and by holding dialogues with the user. When the data definitions are ended, an inquiry of FIG. 17 is made. In response to this, the user inputs a sentence 196. Here, letters A, B, D, ---, and so on appearing in the sentence are the stems of the verbs expressing the operations for processing the data. In response to this input sentence, the system performs the following processings at a step 187:

(7) First of all, the data defined in the foregoing items (1) to (6) and the stems of the verbs expressing the operations for processing the data are extracted from the input Japanese sentence by the Japanese sentence analysis block 97. Without these data and verbs, the data and verbs are retained by an inquiry.

(8) Next, by using the types of the data handled at the processing (7) and the stems of the verbs as the keywords for retrieving the program parts, the program parts data base 94 stored with the program parts are retrieved by the search for program parts block 99.

The program parts include those which are written with the types of data and the stems of the verbs expressing the data processing operations for the retrievals, as indicated at 216 and 217 in FIG. 17.

(9) If the aforementioned processings (7) and (8) are performed to retrieve the program parts, the process of a step 188, i.e., the fetch of the retrieved parts into the descriptive portion of the program is performed. Otherwise, the processings of steps 190 and 191 are performed. Incidentally, in the case of the steps 196 and 197 of FIG. 17, the processings of the aforementioned steps 190 and 191 are first performed for the sentence 196, assuming that the corresponding parts cannot be retrieved. These processings are as follows.

(10) The stems of the verbs extracted in the processing (7) are transformed into Roman characters and used as an auxiliary program name, and the variables extracted in the processing (7) and expressing the data are placed as the arguments of the auxiliary program at the descriptive portion of the main program.

(11) In order to obtain finer information of the program defined sentence inputted at first and to define the auxiliary program, a sentence of "What do you mean ~?" is displaced for inquiry. Here, the portion "~" writes (as should be referred to 198 of FIG. 17) what the program parts could not retrieve in the previous input sentence.

(12) The auxiliary program introduced in the processing (10) is formed in the declaration portion of the procedure of the Pascal program, as at 218 in FIG. 17.

(13) Procedures similar to those (7) and (8) are repeated for the defined sentence (199 of FIG. 17) of the auxiliary program inputted by the user in response to the inquiry of the procedure (11). In the sentence 199 of FIG. 17, the corresponding program parts 216 are found, the processing program written therein is placed (209 of FIG. 17) in the descriptive portion of the aforementioned axuliary program 218.

Since, at this time, the variable name of the program written in the program parts is given a false one, it is made identical to that used in the auxiliary program fetched.

As described above, the auxiliary program 218 for the sentence 196 of FIG. 17 is prepared, and the sentence 197 is likewise subjected to the foregoing processings (10) to (13). In this case, a sentence 201 is inputted by the user for a sentence 200, but processings similar to those (10) and (11) are repeated by preparing an auxiliary program 220 in the foregoing auxiliary program B 219 because there is no program parts corresponding to that sentence. In this case, the access to the auxiliary program is placed (213 of FIG. 17) at the descriptive portion of the auxiliary program.

Since a setence 203 of FIG. 17 has the corresponding program parts 217, on the other hand, a processing program F 212 is placed at the descriptive portion of the auxiliary program E like the processing (13).

Thus, the program is completed and is stored in the generated program data base 95 by the program generation block 100.

The foregoing processings will be generally described in the following. For the process defined sentence of the program inputted, more specifically, the data handled and the verbs expressing the processing operations for the data are extracted, and the corresponding program parts are retrieved and introduced. If no corresponding part is found, the definition of the auxiliary program is inquired for the user by using the stems of the verbs as the auxiliary program name and by using the data as the argument of the auxiliary program, and the data and the verbs are extracted again from the defining sentence of the auxiliary program inputted to retrieve the program parts. If the parts are found, they are fetched into the definition body of the auxiliary program. Otherwise, the auxiliary program is repeatedly generated until the program parts are found. When this auxiliary program is defined, the data to be handled only in the auxiliary program are also defined.

If insufficient or contradictory points are found in the input sentence in the course of these processings, an inquiry is made by the query sentence generation block 98 to correct them through the dialogues with the user.

Incidentally, with the use of giving a general summary of the program, when it is to be generated, and making it gradually finer and finer, the program would be generated more easily to achieve the module and structure of the software so that an understandable program could be generated. Moreover, the gradual procedure of the program corresponds to that for gradually generating the auxiliary program to automate the module and structure of the program so that the program is understandable.

According to the embodiment described above, the user can automatically generate an understandable program having an excellent structure by holding dialogues with the system.

As has been described hereinbefore, according to the first to fourth embodiments of the present invention, the document information and the related information of the data specification and the central data object are extracted, and the data object is hierarchized through the links of generalized concepts to generate the specification information data base in which a concept structure having the lowest-level generalized concept, the document information and the data specification are linked through the concept expressing links. By constructing the dictionary data base including the noun dictionary and the synonym dictionary for analyzing and abstracting the data objects of the specification to be newly registerd, the existing specifications are systematically partitioned to make it possible to provide a software development supporting system which can automatically register a new specification in a suitable portion of the data base in accordance with that partitioned system.

Moreover, there can be attained another prominent effect that a software development supporting system which can efficiently select the document of a proper software can be realized on the basis of a similar concept by analyzing the retrieval request sentence inputted by the user and by finding out the corresponding data type through the collation between the data type name and operation name from the retrieval request sentence and the stored concept data base.

A fifth embodiment of the present invention will be described in the following.

According to a feature of this fifth embodiment, there is prepared a terminology dictionary describing the keyword information on whether or not each word to be described in the request specification becomes a retrieval keyword when it is solely used or whether or not the same becomes the retrieval keyword in the case of what position of the composed word it appears in. If any word constructing the composed word having failed to be registered in one word in the terminology dictionary or including an unregistered word is found to have corresponding keyword information, it is judged from the relation between the keyword information and the before and behind words whether or not the word is the retrieval keyword.

The terminology dictionary describing the keyword information concerning whether or not each word becomes the retrieval keyword when it is solely used or whether it becomes the retrieval keyword in the case of what position it appears in operates to provide not only the keyword information of one word but also the keyword information for the individual words composing a word.

As a result, in case it is judged whether or not the word of the candidate for the retrieval keyword extracted from the request specification sentence of natural language is an effective one, the keyword judgement can be made as to all the composed words in relation to the keyword information of the individual words composing the composed word and the before and behing word, even if that word is a composite one which has failed to be registered in the terminology dictionary.

The fifth embodiment will be described in the following with reference to FIGS. 18 to 21.

Figure 19:
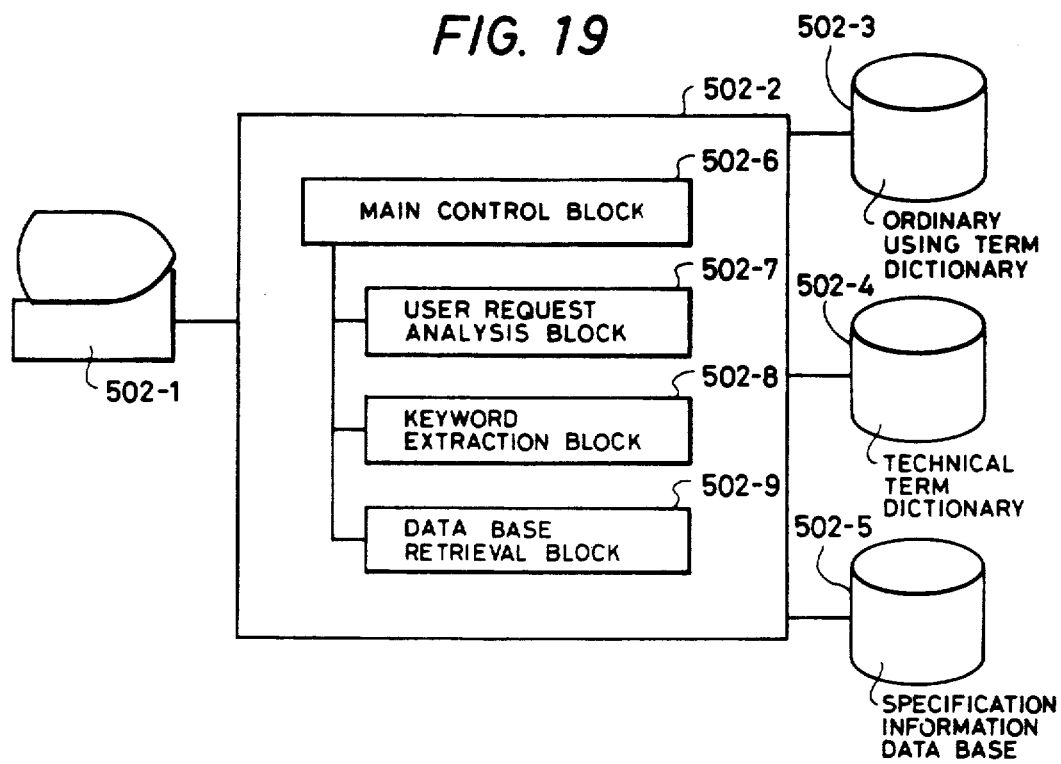
FIG. 19 is a block diagram showing the structure of a system for realizing the fifth embodiment.

FIG. 19 is a block diagram showing the system structure for realizing the present invention.

In FIG. 19: reference numeral 502-1 denotes a video data terminal composed of a display and a keyboard; numeral 502-2 a computing processor; numeral 502-3 an ordinary using term dictionary; numeral 502-4 a technical term dictionary; and numeral 502-5 a specification information data base. Numeral 502-6 denotes a main control block which is composed of a user request analysis block 502-7, a keyboard extraction block 502-8, and a data base retrieval 502-9.

Figure 18:
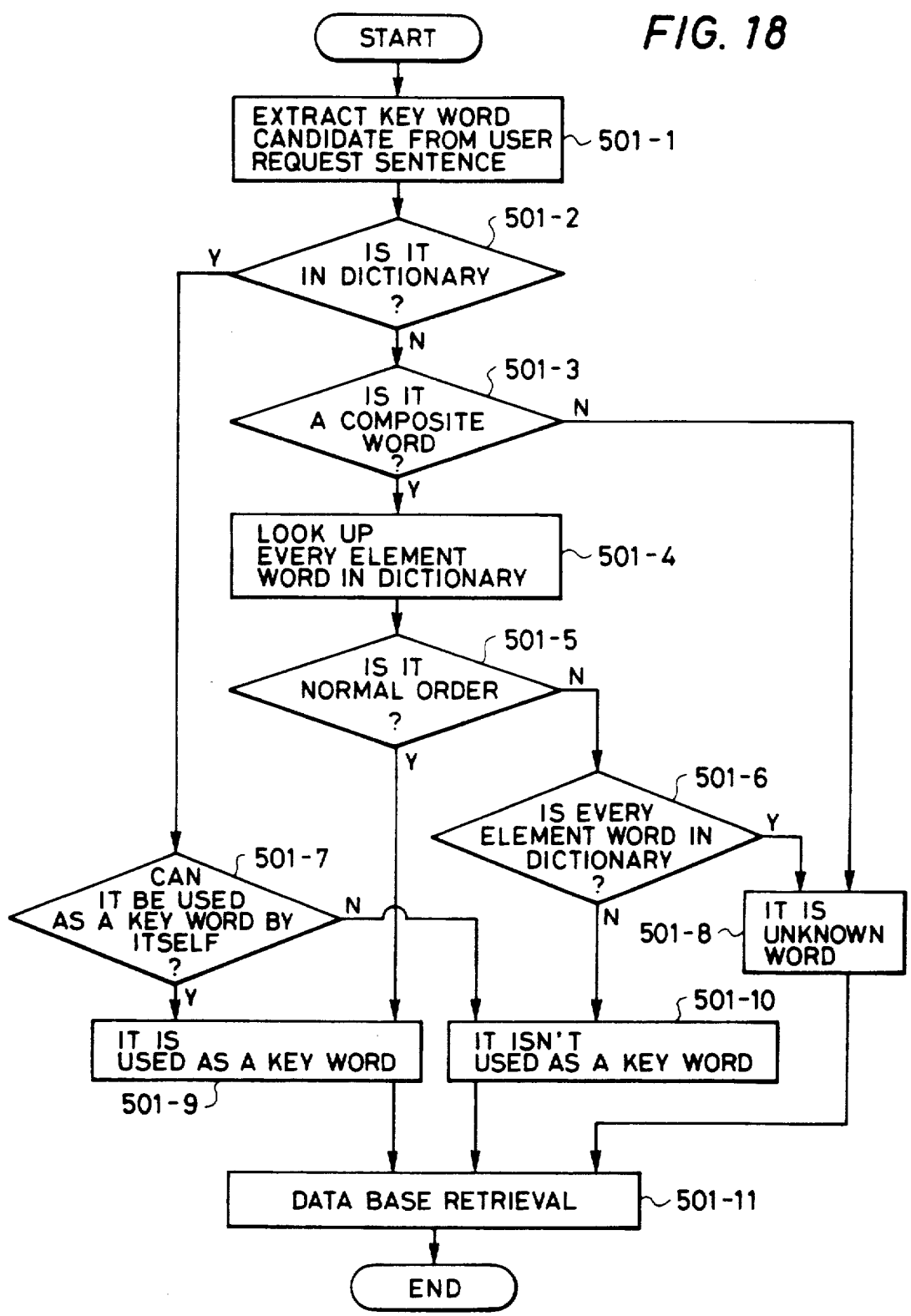
FIG. 18 is a flow chart showing the flow of operations of a fifth embodiment of the present invention.

Next, the processing procedure of the present embodiment will be described with reference to FIG. 18, which is a flow chart showing the flow of the operations of the present embodiment.

First of all, at the step 501-1, the user request sentence described in natural Japanese is analyzed by the user request analysis block 502-7 to extract a word or a candidate for the retrieval key word.

For each candidate, moreover, it is judged by the keyword extraction block 502-8 at steps 501-2 to 501-10 whether or not the candidate is the retrieval keyword.

First of all, at the step 501-2, the candidate as one word consults the terminology dictionary. If it is judged that the word is registered in the dictionary, the keyword information is extracted from the terminology dictionary at the step 501-7. It is then judged whether or not the keyword information itself is the retrieval keyword. The keyword information is used as the retrieval keyword at the step 501-9, if YES, but not at the step 501-10 if NO.

If it is judged at the step 501-2 that the word is not registered in the terminology dictionary, it is judged at the step 501-3 whether or not the word is a composed one. If NO, the word is absolutely unknown so that it cannot be judged as to whether or not it is the retrieval key word. Therefore, this word is accepted as an unknown word at the step 501-8.

If YES, the composed word is partitioned at the step 501-4. And, every element word composing the composed word is looked up in the terminology dictionary. As to the word which is judged to be registered in the dictionary, the keyword information is extracted from the dictionary at the step 501-5 and is judged whether or not it is the retrieval keyword in the composed word. If YES, it is judged whether or not the relations with the before and behind words accord to the using method determined in the keyword information. If YES, the word is used as the retrieval key word at the step 501-9.

In case the keyword information of the dictionary is different, it is judged at the step 501-6 whether or not an unregistered element is contained in each word if it is judged that the word order is not that of the retrieval keyword. If NO, the word is not used as the key word at the step 501-10. If YES, the word is accepted as an unknown one.

When the judgements of all the words are ended, the existing specification is retrieved by the data base retrieval 502-9.

The processing procedures described above are the schematic ones of the present embodiment.

Next, the method of judging the retrieval keyword will be actually described by way of example.

Figure 20:
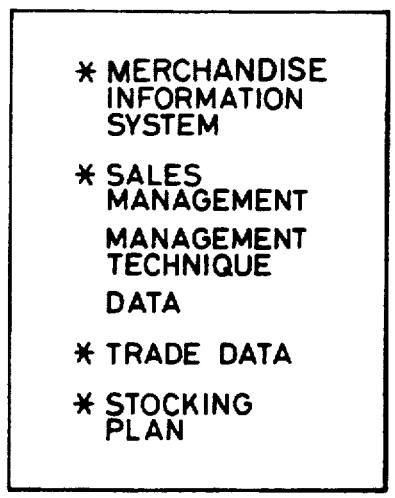
FIG. 20 is a diagram showing candidate words for a retrieval keyword.

FIG. 20 shows a candidate word for the retrieval keyword. The asterisked words are those which are judged to be the retrieval keywords.

FIG. 21 shows an example of the keyword information of the dictionary to be used for judging the example of FIG. 20. The description of the keyword information may make several descriptions or not for one word. The unregistered word may take the place of a <noun>. The dictionary has many other informations such as parts of speech or conjugations, which are omitted here. Moreover, the composed nouns are not registered in the dictionary.

First of all, the "merchandise information system" belongs, as it is, to an unknown word but becomes a retrieval keyword because it is enabled to take the form of "<noun> +system" of the dictionary information 1 if it is partitioned from the "merchandise/information/system".

The "sales management" is also used as the retrieval keyword from the dictionary information 3 if it is partitioned from the "sales/management".

The "management technique" does not belong to the using method of the dictionary information even if it is partitioned from the "management/technique". Therefore, this word is used as an unknown word, if the "technique" is unregistered, and is not used as a retrieval keyword if not.

Since the "data" is not a composed one, it cannot be the retrieval keyword by itself with direct reference to the dictionary information 2.

The "trade data" is caused to belong to the dictionary information 2 by partitioning it into the "trade/data" and is used as the retrieval key word.

The "stocking plan" can be used as the retrieval keyword even if the "stocking" is sole, by partitioning it into the "stocking/plan", so that it becomes the retrieval keyword as a whole.

With the dictionary information of FIG. 21, on the other hand, other words such as the "accounting subsystem", the "inventory data", the "shop management" and the "purchase" are used as the retrieval keywords.

Thus, by registering the keyword information of every element composing a composed word in the dictionary, even the totally unknown composed word or the composed noun containing an unknown word can be judged to be the retrieval keyword, if one of them looks up the keyword information and if the using method applies to the keyword information, so that the incapable frequency of the judgement is considerably reduced.

Even in case the keyword information is to be registered in the dictionary, on the other hand, it is sufficient to register a "some management" or the concept providing a reference used usually by the user for judging the retrieval keyword. The registration is easy to think and is not required for an intrinsic composed word so that its number is drastically reduced.

FIGS. 20 and 21 exemplies the terms for distribution business, but the dictionary is divided into the ordinary using term one and the technical term one. If the keyword information or words intrinsic to the business are registered in the technical term dictionary whereas the keyword information or words shared in the business are registered in the ordinary using term dictionary, the change in the field of the user request syntax can be matched without any touch of the ordinary using term dictionary merely by replacing the technical term dictionary by a new field one.

According to the fifth embodiment of the present invention, even the composed word left unregistered in the dictionary can be judged as to whether or not it is used as the retrieval keyword to improve the extraction percentage of the effective retrieval keyword and the retrieval performance of the existing specification.

In case, moreover, the keyword information is to be registered in the dictionary, all the composed words considerable need not be registered so that the number of words to be registered can be reduced. The content of the keyword information can be registered in a form near the reference for user's judging the retrieval keyword so that the dictionary registration can be facilitated.

What is claimed is:

1. A program specification reusing method for use in a software information reusing system having a data base for storing program specifications, a dialogue display terminal, and a processor for processing information inputted by use of said display terminal, the method comprising the steps of:

storing a program specification in said data base;

automatically extracting by the processor from said program specification a data object comprising a data type and an operation for processing said data type, as a first retrieval information;

storing said first retrieval information in said data base as a datum having a pertinent relational position of a link of a data information related concept comprising a hierarchical expression of data objects including a combination of said data type and said operation;

automatically extracting by the processor of a second retrieval information from an inputted retrieval request information;

consulting said data information related concept for determining whether said second retrieval information is stored in said link in said data base;

linking by the processor of said second retrieval information with one of the first retrieval information stored in said data base as a concept expression link, when said second retrieval information is stored as a first retrieval information in said data base; and, if said second retrieval information is not stored, judging by the processor whether a third retrieval information, comprising a synonym or a similar information of said second retrieval information, exists in said link in said data base.

2. A program specification reusing method according to claim 1, wherein said link in said data base includes a concept abstracted link and a partitioned link between at least a pair of said data type and said operation of said data objects.

3. A program specification reusing method according to claim 2, wherein when said second retrieval information is not in said link in said data base, said judging step analyzes and abstracts the data object extracted from said specification.

4. A program specification reusing method according to claim 1, wherein said system has a terminology dictionary containing information for determining a retrieval keyword for said retrieval request information as to whether a word selected as a candidate for said retrieval keyword is qualified as said retrieval keyword when it is solely used and whether said word is qualified as said retrieval keyword in the case of what position of a composed word said word appears in, so that only an effective word and not a meaningless one may be selected as said retrieval keyword from the words selected as the candidate for said retrieval keyword.

5. A program specification reusing method according to claim 4, wherein when said second retrieval information is a composed word which is not registered as one word or including an unknown word, said judging step judges said retrieval keyword from the relationships between the retrieval keyword and the elements composing said composed word and the before and behind words of said composed word.

6. A program specification reusing method according to claim 1, wherein said at least a synonym or a similar information further contains an abstract information, a lower level information and a partitioning information.

7. A program specification reusing method according to claim 1, wherein said retrieval request information is in a natural language.

8. A program specification retrieving system comprising:
    a data base for storing program specification information;
    a dialogue display terminal;
    means for automatically extracting a data object comprising a data type and an operation for processing said data type, in a program specification as a first retrieval information when said program specification is stored;
    means for storing said first retrieval information as a datum in a pertinent relational position of a link of a data information related concept including a combination of said data type and said operation, in said data base;
    means for automatically extracting a second retrieval information from a retrieval request information;
    means for consulting said link of said related concept as to whether said second retrieval information is stored in said link;
    means for linking said second retrieval information with said first retrieval information stored in said data base as a concept expression link, when said second retrieval information is stored as said first retrieval information in said data base; and,
    means for judging, if said second retrieval information is not stored, a third retrieval information comprising a synonym or of similar information of said second retrieval information, exists in said link in said data base.

9. A program specification retrieving system according to claim 8, wherein said means for storing further has means for storing said operation in a frame wherein said data object is abstracted and hierarchised, and said system further has means for extracting nouns expressing said data type and said operation from a natural language of a retrieval request made in a natural language inquiry in case said nouns are not in a first inquiry so that a data base information requested by a user is retrieved from a corresponding type and operation in said data base.

10. An information retrieving method for use with a system having a data base for storing software specification information, a dialogue display terminal, a memory for storing a concept data dictionary, and a computer for processing input information inputted by use of said display terminal, the method comprising the steps of:
    inputting a natural language sentence describing a retrieval request for retrieving a software specification stored in said data base;
    analyzing, with said processor, the syntax of said inputted natural language sentence to extract a data name and an operation name as key information to retrieve said software specification;
    consulting, with the processor, said dictionary, which defines data objects containing at least a data name and an operation for processing said data name in respective pertinent relational positions of data links of related concepts, for identifying a concept related to said key information; and,
    retrieving a first software specification by consulting a data object link linking said related concepts of data name and operation name of said first software specification in said data base, when said concepts related to said key information exists.

11. A program parts retrieving method for use with a software information reusing system having a data base for storing software specification information, a dialogue display terminal, and a computer for processing input information inputted by use of said display terminal, the program parts retrieving method comprising the steps of:
    storing a program specification of a program part in said data base;
    automatically extracting, using said processor, at least a data type and a stem of a verb as a first retrieval information from said program specification;
    storing, using said processor, said first retrieval information as a datum in a pertinent relational position of a first link of a data information related concept including a combination of said data type and said stem of a verb, in said data base;
    inputting a definition sentence to retrieve a program part from said data base;
    automatically extracting at least a step of a verb expressing an operation of a processing as a second retrieval information from said definition sentence, for consulting said first link in said data base;
    retrieving a program part named in relation to said first retrieval information in said data base, by consulting said first link in said data base as to whether said second retrieval information exists, said retrieving a program part step being performed by said processor;
    automatically generating a program skeleton according to said definition sentence, said automatically generating step performed by said processor; and,
    automatically generating a program by using said skeleton and said retrieved program part.

12. A program parts retrieving method according to claim 11, wherein the operation of retrieving said program part further comprises the steps of:
    transforming the stem of said verb, if the corresponding program part is not found, into an auxiliary program name and said data into an argument of said auxiliary program with characters;

inquiring a user through said dialogue display terminal, of a definition of the body of said auxiliary program to refine said definition sentence; and, repeatingly automatically extracting data and a stem of a verb from the definition sentence of the auxiliary program inputted to retrieve said program part.

13. A program parts retrieving method according to claim 11, further comprising the step of:

changing the formats of the data in the retrieval program part to those of said skeleton, said changing step performed by said computer.

14. An information retrieving system having a data base and a processor for storing program specifications, the program specification retrieving method comprising the steps of:

storing said program specification in said data base;

automatically extracting by the processor of a data object containing at least a data type and an operation for processing said data type, as a first retrieval information from said program specification;

storing said first retrieval information in said data base as a datum in a pertinent relational position of a link of a data information related concept comprising a hierarchical expression of data objects in combination of said data type and said operation;

inputting a request specification sentence for retrieving a program specification in said data base;

automatically extracting a word in said request specification sentence;

judging whether said word is qualified as a retrieval keyword when it is solely used, by consulting said link, and a terminology dictionary having relational structures among a plurality of terminologies, said judging step performed by said processor;

judging whether said word is qualified as said retrieval keyword when it appears at a position of a composed word by consulting said dictionary, said judging step performed by said processor;

composing a word as a keyword in accordance to said position of the composed word and the before and behind words of said composed word, said composing step performed by said processor; and, judging whether said composed word is qualified as a keyword by consulting said link and said terminology dictionary.

15. A method of registering information of a new program specification to facilitate reusing program parts of a software program specified by the new program specification for consistent and efficient software development, the method being used in a system having a data base storing preexisting other program specifications, comprising the steps of:

storing the new program specification in said data base for said reusing software program;

selectively extracting by the processor of a keyword comprising a data type and an operation for processing said data type, of the new specification as a retrieval information representative of the new specification;

storing said retrieval information as a datum in a pertinent relational position of a link of a data information related concept including a combination of said data type and said operation, in said data base;

analyzing by the processor of the keyword for identifying a related concept on the basis of a dictionary having relational structures among a plurality of concepts as related retrieval information representative of the new program specification;

comparing the related concept with other concepts previously stored in the link and when no corresponding concepts are found, storing the related concept; and, linking the retrieval information to said related retrieval information for the new program specification whereby a programmer may reuse the program part.

16. A method of registering information of a new program specification according to claim 15, wherein:

said related concept to be compared with the other concepts previously stored in the link is a synonym, a similar word, an abstracted concept, or a partitioned concept of said keyword.

17. A program specification reusing method for use in a software information reusing system having a data base for storing program specifications, a dialogue display terminal, and a processor for processing information inputted by use of said display terminal, the method comprising the steps of:

storing a program specification in said data base;

automatically extracting by the processor from said program specification a data object comprising a data type and an operation for processing said data type, as a first retrieval information;

storing said first retrieval information in said data base as a datum having a pertinent relational position of a link of a data information related concept comprising a hierarchical expression of data objects including a combination of said data type and said operation;

automatically extracting by the processor of a second retrieval information from an inputted retrieval request information;

consulting said data information related concept for determining whether said second retrieval information is stored in said link in said data base;

linking by the processor of said second retrieval information with one of the first retrieval information stored in said data base as a concept expression link, when said second retrieval information is stored as a first retrieval information in said data base; and, if said second retrieval information is not stored, judging by the processor whether a third retrieval information, comprising a synonym or a similar information of said second retrieval information, exists in said link in said data base wherein the judging comprises analyzing and abstracting the data object.

* * * * *

UNITED STATES PATENT AND TRADEMARK OFFICE
CERTIFICATE OF CORRECTION

PATENT NO. : 5,123,103
DATED : June 16, 1992
INVENTOR(S) : Noriko Ohtaki, et al.

It is certified that error appears in the above-identified patent and that said Letters Patent is hereby corrected as shown below:

Claim 11, column 22, line 46, delete "step" and replace with --stem--.

Signed and Sealed this

Third Day of August, 1993

Attest:

MICHAEL K. KIRK

*Attesting Officer*     *Acting Commissioner of Patents and Trademarks*